United States Patent
Ki et al.

(10) Patent No.: US 12,321,236 B2
(45) Date of Patent: Jun. 3, 2025

(54) SYSTEMS, METHODS, AND DEVICES FOR FAULT RESILIENT STORAGE

(71) Applicant: Samsung Electronics Co., Ltd., Suwon-si (KR)

(72) Inventors: Yang Seok Ki, Palo Alto, CA (US); Sungwook Ryu, Palo Alto, CA (US); Alain Tran, Hwasung-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/232,144

(22) Filed: Apr. 15, 2021

(65) Prior Publication Data

US 2021/0349782 A1   Nov. 11, 2021

Related U.S. Application Data

(60) Provisional application No. 63/128,001, filed on Dec. 18, 2020, provisional application No. 63/057,744, (Continued)

(51) Int. Cl.
*G06F 11/00* (2006.01)
*G06F 3/06* (2006.01)
(Continued)

(52) U.S. Cl.
CPC ........ *G06F 11/1428* (2013.01); *G06F 3/0619* (2013.01); *G06F 3/0634* (2013.01); (Continued)

(58) Field of Classification Search
CPC ............. G06F 11/1428; G06F 11/1084; G06F 11/0727
See application file for complete search history.

(56) References Cited

U.S. PATENT DOCUMENTS

| | | | |
|---|---|---|---|
| 5,546,533 A | 8/1996 | Koyama | |
| 5,914,967 A * | 6/1999 | Yomtoubian | G11B 27/36 714/E11.144 |

(Continued)

FOREIGN PATENT DOCUMENTS

| | | |
|---|---|---|
| CN | 1924786 A | 3/2007 |
| CN | 101084486 A | 12/2007 |

(Continued)

OTHER PUBLICATIONS

Office Action for U.S. Appl. No. 17/226,059, mailed Oct. 29, 2021.
(Continued)

*Primary Examiner* — Philip Guyton
(74) *Attorney, Agent, or Firm* — Renaissance IP Law Group LLP

(57) ABSTRACT

A method of operating a storage device may include determining a fault condition of the storage device, selecting a fault resilient mode based on the fault condition of the storage device, and operating the storage device in the selected fault resilient mode. The selected fault resilient mode may include one of a power cycle mode, a reformat mode, a reduced capacity read-only mode, a reduced capacity mode, a reduced performance mode, a read-only mode, a partial read-only mode, a temporary read-only mode, a temporary partial read-only mode, or a vulnerable mode. The storage device may be configured to perform a namespace capacity management command received from the host. The namespace capacity management command may include a resize subcommand and/or a zero-size namespace subcommand. The storage device may report the selected fault resilient mode to a host.

19 Claims, 18 Drawing Sheets

Related U.S. Application Data filed on Jul. 28, 2020, provisional application No. 63/052,854, filed on Jul. 16, 2020, provisional application No. 63/051,158, filed on Jul. 13, 2020, provisional application No. 63/023,243, filed on May 11, 2020.

(51) Int. Cl.
*G06F 11/10* (2006.01)
*G06F 11/14* (2006.01)
*G06F 11/16* (2006.01)

(52) U.S. Cl.
CPC ........ *G06F 3/0673* (2013.01); *G06F 11/1084* (2013.01); *G06F 11/165* (2013.01); *G06F 2201/85* (2013.01)

(56) References Cited

U.S. PATENT DOCUMENTS

| | | | |
|---|---|---|---|
| 6,049,439 A | 4/2000 | Ono et al. | |
| 6,154,853 A | 11/2000 | Kedem | |
| 6,301,644 B1 | 10/2001 | Andoh et al. | |
| 6,883,126 B1 | 4/2005 | Herman et al. | |
| 6,995,943 B1 | 2/2006 | Shrestha et al. | |
| 7,343,546 B2 | 3/2008 | Edirisooriya et al. | |
| 7,451,346 B2 | 11/2008 | Katsuragi et al. | |
| 7,536,595 B1 | 5/2009 | Hiltunen et al. | |
| 7,574,623 B1 | 8/2009 | Goel et al. | |
| 7,590,664 B2 | 9/2009 | Kamohara et al. | |
| 7,640,450 B1 | 12/2009 | Anvin et al. | |
| 7,774,643 B2 | 8/2010 | Wang | |
| 7,797,567 B2 | 9/2010 | Otaka et al. | |
| 7,904,749 B2 | 3/2011 | Kawaguchi | |
| 8,015,436 B2 | 9/2011 | Winokur | |
| 8,082,390 B1 | 12/2011 | Fan et al. | |
| 8,099,623 B1 | 1/2012 | Li et al. | |
| 8,261,016 B1 | 9/2012 | Goel | |
| 8,386,834 B1 | 2/2013 | Goel et al. | |
| 8,458,515 B1 | 6/2013 | Saeed | |
| 8,589,723 B2 | 11/2013 | Kumar et al. | |
| 8,769,535 B2 | 7/2014 | Mani | |
| 8,812,902 B2 | 8/2014 | Deepak | |
| 8,838,893 B1 | 9/2014 | Randall et al. | |
| 8,839,028 B1 | 9/2014 | Polia et al. | |
| 8,924,775 B1 | 12/2014 | Siew et al. | |
| 8,977,813 B2 | 3/2015 | Burd | |
| 9,122,405 B1 | 9/2015 | Ludwig et al. | |
| 9,176,813 B2 | 11/2015 | Guo et al. | |
| 9,268,489 B2 | 2/2016 | Aizman et al. | |
| 9,378,083 B2 | 6/2016 | Ghaly et al. | |
| 9,378,093 B2 | 6/2016 | Cooper et al. | |
| 9,397,703 B2 | 7/2016 | Ghaly et al. | |
| 9,547,562 B1 | 1/2017 | Feathergill et al. | |
| 9,710,317 B2 | 7/2017 | Gupta et al. | |
| 9,715,436 B2 | 7/2017 | Karrotu et al. | |
| 9,728,277 B2 | 8/2017 | Lee et al. | |
| 9,740,560 B2 | 8/2017 | Molaro et al. | |
| 9,823,840 B1 | 11/2017 | Brooker et al. | |
| 9,830,236 B2 | 11/2017 | Antony | |
| 9,940,028 B2 | 4/2018 | Tomlin | |
| 10,013,325 B1 | 7/2018 | Garrett, Jr. et al. | |
| 10,082,965 B1 | 9/2018 | Tamilarasan et al. | |
| 10,095,506 B2 | 10/2018 | Venkatesh et al. | |
| 10,102,082 B2 | 10/2018 | Cabrera et al. | |
| 10,121,551 B1 | 11/2018 | Miller et al. | |
| 10,157,004 B2 | 12/2018 | Michaeli | |
| 10,210,062 B2 | 2/2019 | Agombar et al. | |
| 10,263,842 B2 | 4/2019 | Bursell | |
| 10,296,255 B1 | 5/2019 | Tummala | |
| 10,372,558 B2 | 8/2019 | Park et al. | |
| 10,445,200 B2 | 10/2019 | Park et al. | |
| 10,452,289 B1 | 10/2019 | Colgrove et al. | |
| 10,459,808 B2 | 10/2019 | Walls | |
| 10,558,563 B2 | 2/2020 | Kanno | |
| 10,572,161 B2 | 2/2020 | Subramanian et al. | |
| 10,585,749 B2 | 3/2020 | Kachare et al. | |
| 10,796,762 B2 | 10/2020 | Peddle et al. | |
| 10,884,648 B2 | 1/2021 | Guo et al. | |
| 10,915,401 B2 | 2/2021 | Fujii et al. | |
| 10,929,229 B2 | 2/2021 | Stoica et al. | |
| 11,055,172 B2 | 7/2021 | Foley | |
| 11,132,256 B2 | 9/2021 | Roberts | |
| 11,314,571 B2 | 4/2022 | Li | |
| 11,909,809 B2 | 2/2024 | Kawabata | |
| 2002/0162057 A1* | 10/2002 | Talagala | G06F 11/008 714/E11.144 |
| 2004/0250033 A1 | 12/2004 | Prahlad et al. | |
| 2005/0120267 A1 | 6/2005 | Burton et al. | |
| 2006/0069870 A1* | 3/2006 | Nicholson | G06F 1/30 711/E12.04 |
| 2006/0075185 A1* | 4/2006 | Azzarito | G06F 12/0866 711/E12.019 |
| 2006/0143507 A1 | 6/2006 | Tanaka | |
| 2007/0101188 A1 | 5/2007 | Lin | |
| 2007/0220313 A1 | 9/2007 | Katsuragi et al. | |
| 2007/0250723 A1* | 10/2007 | Shima | G06F 11/0793 713/300 |
| 2008/0126849 A1 | 5/2008 | Kotzur et al. | |
| 2008/0126855 A1* | 5/2008 | Higashijima | G06F 11/0781 714/E11.023 |
| 2008/0168304 A1 | 7/2008 | Flynn et al. | |
| 2009/0106584 A1 | 4/2009 | Nakayama et al. | |
| 2009/0164536 A1 | 6/2009 | Nasre et al. | |
| 2009/0222617 A1 | 9/2009 | Yano et al. | |
| 2009/0248756 A1 | 10/2009 | Akidau et al. | |
| 2010/0049905 A1 | 2/2010 | Ouchi | |
| 2010/0079885 A1 | 4/2010 | McKean | |
| 2010/0125751 A1 | 5/2010 | McKean | |
| 2011/0012147 A1 | 1/2011 | Bierhuizen et al. | |
| 2011/0047437 A1 | 2/2011 | Flynn | |
| 2012/0117322 A1 | 5/2012 | Satran et al. | |
| 2013/0047028 A1 | 2/2013 | Daikokuya et al. | |
| 2013/0054907 A1 | 2/2013 | Ikeuchi et al. | |
| 2013/0080828 A1 | 3/2013 | Sheffield | |
| 2013/0097375 A1 | 4/2013 | Iida | |
| 2013/0173955 A1 | 7/2013 | Hallak et al. | |
| 2013/0191703 A1 | 7/2013 | Meaney et al. | |
| 2013/0282953 A1 | 10/2013 | Orme et al. | |
| 2014/0032834 A1 | 1/2014 | Cudak et al. | |
| 2014/0089730 A1 | 3/2014 | Watanabe et al. | |
| 2014/0149787 A1 | 5/2014 | Shanbhag et al. | |
| 2014/0195847 A1 | 7/2014 | Webman et al. | |
| 2014/0281689 A1 | 9/2014 | Fischer | |
| 2014/0359347 A1 | 12/2014 | Fuxa | |
| 2015/0100720 A1 | 4/2015 | Flynn et al. | |
| 2015/0100822 A1 | 4/2015 | Ohno | |
| 2015/0234709 A1 | 8/2015 | Koarashi | |
| 2015/0269025 A1 | 9/2015 | Krishnamurthy et al. | |
| 2016/0004467 A1 | 1/2016 | Green et al. | |
| 2016/0077911 A1* | 3/2016 | Malshe | G11C 16/08 714/773 |
| 2016/0132394 A1* | 5/2016 | Niewczas | G06F 3/06 714/6.22 |
| 2016/0299722 A1 | 10/2016 | Seo et al. | |
| 2016/0342465 A1 | 11/2016 | Cudak et al. | |
| 2017/0060421 A1 | 3/2017 | Dawkins et al. | |
| 2017/0123654 A1 | 5/2017 | Standing | |
| 2017/0177216 A1 | 6/2017 | Freyensee et al. | |
| 2017/0220374 A1 | 8/2017 | Beveridge et al. | |
| 2017/0351431 A1* | 12/2017 | Dewitt | G06F 12/0238 |
| 2018/0011376 A1 | 1/2018 | Cho et al. | |
| 2018/0011649 A1 | 1/2018 | Hashimoto et al. | |
| 2018/0018231 A1 | 1/2018 | Okada et al. | |
| 2018/0052750 A1* | 2/2018 | Sun | G06F 11/2089 |
| 2018/0067658 A1 | 3/2018 | Tripathy et al. | |
| 2018/0101450 A1 | 4/2018 | Park et al. | |
| 2018/0113761 A1 | 4/2018 | Ko et al. | |
| 2018/0316756 A1 | 11/2018 | Kuramkote et al. | |
| 2019/0043604 A1 | 2/2019 | Baca et al. | |
| 2019/0050161 A1 | 2/2019 | Wysocki et al. | |
| 2019/0065318 A1 | 2/2019 | Sahasrabudhe et al. | |
| 2019/0087272 A1 | 3/2019 | Lingarajappa | |
| 2019/0087290 A1 | 3/2019 | Rutman et al. | |

(56) References Cited

U.S. PATENT DOCUMENTS

| | | | |
|---|---|---|---|
| 2019/0138239 A1 | 5/2019 | Lv et al. | |
| 2019/0196910 A1 | 6/2019 | Gu et al. | |
| 2019/0377637 A1 | 12/2019 | Pitchumani et al. | |
| 2019/0384670 A1 | 12/2019 | Kuroki et al. | |
| 2020/0020398 A1* | 1/2020 | Miller | G06F 3/0653 |
| 2020/0034235 A1 | 1/2020 | Gao et al. | |
| 2020/0042388 A1 | 2/2020 | Roberts | |
| 2020/0127684 A1 | 4/2020 | Park et al. | |
| 2020/0135280 A1 | 4/2020 | Hu | |
| 2020/0159621 A1 | 5/2020 | Velayuthaperumal et al. | |
| 2020/0310932 A1 | 10/2020 | Hutchison et al. | |
| 2020/0409809 A1 | 12/2020 | Liu | |
| 2021/0011640 A1 | 1/2021 | Hua et al. | |
| 2021/0124504 A1 | 4/2021 | Chiu et al. | |
| 2021/0124506 A1 | 4/2021 | Han et al. | |
| 2021/0279153 A1 | 9/2021 | Patel et al. | |
| 2021/0349782 A1* | 11/2021 | Ki | G06F 3/0634 |
| 2021/0373796 A1 | 12/2021 | Matosevich et al. | |
| 2022/0012130 A1 | 1/2022 | Ki et al. | |
| 2022/0012142 A1 | 1/2022 | Ryu et al. | |
| 2022/0012147 A1 | 1/2022 | Ki et al. | |
| 2022/0019366 A1 | 1/2022 | Freilich et al. | |
| 2022/0291996 A1 | 9/2022 | Ki et al. | |
| 2023/0016170 A1 | 1/2023 | Barker, Jr. et al. | |
| 2024/0012713 A1 | 1/2024 | Steinmetz et al. | |

FOREIGN PATENT DOCUMENTS

| | | |
|---|---|---|
| CN | 101727363 A | 6/2010 |
| JP | H06175792 A | 6/1994 |
| JP | H06274404 A | 9/1994 |
| JP | H10301721 A | 11/1998 |
| JP | H11184644 A | 7/1999 |
| JP | 2006350599 A | 12/2006 |
| JP | 2012509521 A | 4/2012 |
| JP | 2013246479 A | 12/2013 |
| JP | 2017201519 A | 11/2017 |
| JP | 2021033856 A | 3/2021 |
| JP | 2021089625 A | 6/2021 |
| TW | 201413449 A | 4/2014 |
| TW | 201435729 A | 9/2014 |
| TW | 201729102 A | 8/2017 |
| TW | 201810258 A | 3/2018 |
| TW | 201911041 A | 3/2019 |
| TW | 201917580 A | 5/2019 |
| TW | 202009695 A | 3/2020 |
| WO | 2018142622 A1 | 8/2018 |

OTHER PUBLICATIONS

Office Action for U.S. Appl. No. 17/227,262, mailed Oct. 15, 2021.
Notice of Allowance for U.S. Appl. No. 17/109,053, mailed Mar. 18, 2022.
Office Action for U.S. Appl. No. 17/226,059, mailed Sep. 16, 2022.
Office Action for U.S. Appl. No. 17/227,262, mailed Oct. 6, 2022.
Final Office Action for U.S. Appl. No. 17/227,262, mailed May 25, 2022.
Final Office Action for U.S. Appl. No. 17/226,059, mailed May 11, 2022.
Final Office Action for U.S. Appl. No. 17/226,059, mailed Apr. 6, 2023.
Final Office Action for U.S. Appl. No. 17/227,262, mailed Mar. 15, 2023.
Office Action for U.S. Appl. No. 17/226,059, mailed Sep. 6, 2023.
Office Action for U.S. Appl. No. 17/227,262, mailed Jul. 20, 2023.
Office Action for U.S. Appl. No. 17/741,440, mailed Jul. 19, 2023.
Office Action for U.S. Appl. No. 17/827,657, mailed Aug. 10, 2023.
Final Office Action for U.S. Appl. No. 17/226,059, mailed Mar. 15, 2024.
Final Office Action for U.S. Appl. No. 17/827,657, mailed Feb. 16, 2024.
Notice of Allowance for U.S. Appl. No. 17/227,262, mailed Mar. 11, 2024.
Office Action for U.S. Appl. No. 17/741,440, mailed Apr. 19, 2024.
Corrected Notice of Allowability for U.S. Appl. No. 17/227,262, mailed May 17, 2024.
Corrected Notice of Allowability for U.S. Appl. No. 17/226,059, mailed Aug. 8, 2024.
Corrected Notice of Allowability for U.S. Appl. No. 17/227,262, mailed Jul. 17, 2024.
Notice of Allowance for U.S. Appl. No. 17/226,059, mailed Jun. 26, 2024.
Office Action for U.S. Appl. No. 17/827,657, mailed Jul. 16, 2024.
Corrected Notice of Allowability for U.S. Appl. No. 17/226,059, mailed Oct. 9, 2024.
Corrected Notice of Allowability for U.S. Appl. No. 17/226,059, mailed Sep. 26, 2024.
Corrected Notice of Allowability for U.S. Appl. No. 17/227,262, mailed Aug. 28, 2024.
Corrected Notice of Allowability for U.S. Appl. No. 17/227,262, mailed Oct. 25, 2024.
Final Office Action for U.S. Appl. No. 17/741,440, mailed Nov. 8, 2024.
Final Office Action for U.S. Appl. No. 17/827,657, mailed Dec. 4, 2024.
Office Action for U.S. Appl. No. 17/741,440, mailed Mar. 21, 2025.

* cited by examiner

| Case ID | Operation Status | User Data | Can be reused /How to |
|---|---|---|---|
| 1 | Fatal Error | Invalid | No |
| 2 | Fatal Error | Invalid | Yes / Format NVM |
| 3 | Read Only Mode | Valid | No |
| 4 | Write Through Mode | Valid | No |
| 5 | Temperature Safe Mode | Valid | No |
| 6 | Read Only Mode | Valid | Yes / Format NVM |

FIG. 2A

| Mode | Description | P | UP | RO | VRO | IA |
|---|---|---|---|---|---|---|
| 1 | FR_MODE_POWER_CYCLE | 100% | | | | |
| 2 | FR_MODE_REFORMAT | 100% | | | | |
| 3 | FR_MODE_CAPACITY_READ_ONLY* | X% | | (100-X)% | | |
| 4 | FR_MODE_CAPACITY* | X% | | | | (100-X)% |
| 5 | FR_MODE_PERFORMANCE | | 100% | | | |
| 6 | FR_MODE_READ_ONLY | | | 100% | | |
| 7 | FR_MODE_PARTIAL_READ_ONLY* | | | X% | | (100-X)% |
| 8 | FR_MODE_TEMP_READ_ONLY* | | | | 100% | |
| 9 | FR_MODE_TEMP_PARTIAL_REAL_ONLY* | | | | X% | (100-X)% |
| 10 | FR_MODE_VULNERABLE | | | | | 100% |
| 11 | FR_MODE_NORMAL | 100% | | | | |

FIG. 2B

| Command | Subcommand | Description |
|---|---|---|
| Get Feature | FR_INFO_RESILIENCY_TYPE | Type of fault resiliency based on fault condition |
| | FR_INFO_RETENTION_PERIOD | Average retention period without reprogramming media |
| | FR_INFO_EARLIEST_EXPIRY | Maximum time remaining for data integrity |
| | FR_INFO_IOPS | Percentage of maximum IOPS available on failure |
| | FR_INFO_BW | Percentage of maximum bandwidth available on failure |
| | FR_INFO_SPACE | Space available on failure |
| Namespace Capacity Management | FR_NAMESPACE_RESIZE | Resize namespace |
| | FR_NAMESPACE_ZERO_SIZE | Resize namespace to zero |

FIG. 2C

| | |
|---|---|
| FAULT_RESILIENT_FEATURE | - FR_FULLY_RESILIENT<br>    · FR_POWER_CYCLE: device may be recovered by power cycling<br>    · FR_REFORMAT: device may be recovered by reformatting<br>- FR_PARTIAL_RESILIENT<br>    · FR_PERFORMANCE_LOSS: device performance may be reduced<br>        - FR_IOPS: IOPS may be reduced<br>        - FR_BW: bandwidth may be reduced<br>    · FR_CAPABILITY_LOSS<br>        - FR_SUSTAINABLE_READ_ONLY: device may be read-only longer than retention time<br>        - FR_UNSUSTAINABLE_READ_ONLY: device may be read-only up to retention time<br>    · FR_SPACE_LOSS<br>        - FR_SPACE: device storage space may be reduced<br>- VULNERABLE<br>    · GRACEFUL_EXIT |
| FAULT_RESILIENT_STATUS | - FR_IOPS: available IOPS may be X%<br>- FR_BW: available BW may be Y%<br>- FR_SPACE: available storage space may be X%<br>- FR_RETENTION: average retention period of media in storage device |
| FAULT_RESILIENT_VOLATILE_BLOCKS(H) | - List of LBA ranges reaching retention period in H hours |
| FAULT_RESILIENT_INVALID_DATA_BLOCKS | - List of LBA ranges becoming invalid after switch to fault resilient mode |

FIG. 2D

SYSTEMS, METHODS, AND DEVICES FOR FAULT RESILIENT STORAGE

CROSS-REFERENCE TO RELATED APPLICATIONS

This application claims priority to, and the benefit of, U.S. Provisional Patent Application Ser. No. 63/023,243 titled "Fault Resilient Storage Devices and Interfaces" filed May 11, 2020 which is incorporated by reference; U.S. Provisional Patent Application Ser. No. 63/128,001 titled "Systems, Methods, and Devices for Storage with Multiple Fault Isolation Modes" filed Dec. 18, 2020 which is incorporated by reference; U.S. Provisional Patent Application Ser. No. 63/051,158 titled "Fault Resilient Storage Device and Interfaces" filed Jul. 13, 2020 which is incorporated by reference; U.S. Provisional Patent Application Ser. No. 63/052,854 titled "Fault Resilient Drive with Sustainable Read-only Feature" filed Jul. 16, 2020 which is incorporated by reference; and U.S. Provisional Patent Application Ser. No. 63/057,744 titled "Fault Resilient RAID-0 Method Using Fault Resilient Drives" filed Jul. 28, 2020 which is incorporated by reference.

TECHNICAL FIELD

This disclosure relates generally to storage, and more specifically to systems, methods, and devices for fault resilient storage.

BACKGROUND

A storage device may encounter a fault condition that may affect the ability of the storage device to operate in a storage system.

The above information disclosed in this Background section is only for enhancement of understanding of the background of the invention and therefore it may contain information that does not constitute prior art.

SUMMARY

A method of operating a storage device may include determining a fault condition of the storage device, selecting a fault resilient mode based on the fault condition of the storage device, and operating the storage device in the selected fault resilient mode. The selected fault resilient mode may include a power cycle mode. The selected fault resilient mode may include a reformat mode. The selected fault resilient mode may include a reduced capacity read-only mode. The selected fault resilient mode may include a reduced capacity mode. The selected fault resilient mode may include a reduced performance mode. The selected fault resilient mode may include a read-only mode. The selected fault resilient mode may include a partial read-only mode. The selected fault resilient mode may include a temporary read-only mode. The selected fault resilient mode may include a temporary partial read-only mode. The selected fault resilient mode may include a vulnerable mode. The selected fault resilient mode may include a normal mode. The storage device may be configured to perform a command received from a host. The command may include a namespace capacity management command. The namespace capacity management command may include a resize subcommand. The namespace capacity management command may include a zero-size namespace command.

A storage device may include a storage medium, and a storage controller, wherein the storage controller is configured to determine a fault condition of the storage device, select a fault resilient mode based on the fault condition of the storage device, and operate the storage device in the selected fault resilient mode. The selected resilient mode may include one of a power cycle mode, a reformat mode, a reduced capacity read-only mode, a reduced capacity mode, a reduced performance mode, a read-only mode, a partial read-only mode, a temporary read-only mode, a temporary partial read-only mode, or a vulnerable mode. The storage device may be to perform a namespace capacity management command received from a host.

A system may include a host, and at least one storage device coupled to the host, wherein the storage device is configured to determine a fault condition of the storage device, select a fault resilient mode based on the fault condition of the storage device, operate in the selected fault resilient mode, and report the selected fault resilient mode to the host.

A method of operating a storage array may include determining a first fault resilient operating mode of a first fault resilient storage device of the storage array, determining a second fault resilient operating mode of a second fault resilient storage device of the storage array, allocating one or more rescue spaces of one or more additional fault resilient storage devices of the storage array, mapping user data from the first fault resilient storage device to the one or more rescue spaces, and mapping user data from the second fault resilient storage device to the one or more rescue spaces. The method may further include reassigning at least one device identifier (ID) of the one or more additional fault resilient storage devices to a device ID of the first fault resilient storage device. The at least one device ID of the one or more additional fault resilient storage devices may be reassigned based on a current unaffected device ID and a current faulty device ID. The method may further include redirecting one or more inputs and/or outputs (IOs) from the first fault resilient storage device to the one or more additional fault resilient storage devices. The user data may include a strip of data. The strip of data may be redirected to a target storage device of the one or more additional fault resilient storage devices based on a stripe ID of the user data. Mapping user data from the first fault resilient storage device to the one or more rescue spaces may include maintaining a first mapping table. Mapping user data from the second fault resilient storage device to the one or more rescue spaces may include maintaining a second mapping table. The one or more rescue spaces may have a rescue space percentage ratio of a storage device capacity. The rescue space percentage ratio may be greater than or equal to a number of failed storage devices accommodated by the storage array, divided by the total number of storage devices in the storage array. The one or more rescue spaces may be allocated statically. The one or more rescue spaces may be allocated dynamically.

A system may include a storage array including a first fault resilient storage device, a second fault resilient storage device, one or more additional fault resilient storage devices, and a volume manger configured to: determine a first fault resilient operating mode of the first fault resilient storage device, determine a second fault resilient operating mode of the second fault resilient storage device, allocate one or more rescue spaces of one or more additional fault resilient storage devices of the storage array, map user data from the first fault resilient storage device to the one or more rescue spaces, and map user data from the second fault resilient storage device to the one or more rescue spaces. The volume manger may be further configured to reassign at least one device identifier (ID) of the one or more additional fault resilient storage devices to a device ID of the first fault resilient storage device. The volume manger may be further configured to redirect one or more inputs and/or outputs (IOs) from the first fault resilient storage device to the one or more additional fault resilient storage devices. The user data may include a strip of data, and the volume manger may be further configured to redirect the strip of data to a target storage device of the one or more additional fault resilient storage devices based on a stripe ID of the user data. The one or more rescue spaces have a rescue space percentage ratio of a storage device capacity, and the rescue space percentage ratio may be based on a number of failed storage devices accommodated by the storage array, divided by a total number of storage devices in the storage array.

An apparatus may include a volume manager for a storage array, the volume manager may include logic configured to: determine a first fault resilient operating mode of a first fault resilient storage device of the storage array, determine a second fault resilient operating mode of a second fault resilient storage device of the storage array, allocate one or more rescue spaces of one or more additional fault resilient storage devices of the storage array, map user data from the first fault resilient storage device to the one or more rescue spaces, and map user data from the second fault resilient storage device to the one or more rescue spaces. The user data may include a strip of data, and the strip of data may be redirected to a target storage device of the one or more additional fault resilient storage devices based on a stripe identifier (ID) of the user data. The one or more rescue spaces have a rescue space percentage ratio of a storage device capacity, and the rescue space percentage ratio may be based on a number of failed storage devices accommodated by the storage array, divided by a total number of storage devices in the storage array.

A method of operating a storage array may include allocating a first rescue space of a first fault resilient storage device of the storage array, allocating a second rescue space of a second fault resilient storage device of the storage array, determining a fault resilient operating mode of a third fault resilient storage device of the storage array, and mapping user data from the third fault resilient storage device to the first rescue space and the second rescue space based on determining the fault resilient operating mode. A first block of the user data may be mapped to the first rescue space, and a second block of the user data may be mapped to the second rescue space. The user data may include a strip of data. A first portion of the strip of data may be mapped to the first rescue space, and the first portion of the strip of data may include a number of data blocks based on a size of the strip of data and a size of the data blocks. The number of data blocks may be further based on a total number of storage devices in the storage array. The method may further include reassigning at least one device identifier (ID) of the first fault resilient storage device to a device ID of the third fault resilient storage device. The method may further include redirecting one or more inputs and/or outputs (IOs) from the third fault resilient storage device to the first rescue space and the second rescue space. The first rescue space may have a capacity based on a capacity of the first fault resilient storage device and a total number of storage devices in the storage array. The first rescue space may have a capacity of strips based on a size of the first rescue space and a block size.

A system may include a storage array including a first fault resilient storage device, a second fault resilient storage device, a third fault resilient storage device, and a volume manger configured to allocate a first rescue space of the first fault resilient storage device, allocate a second rescue space of the second fault resilient storage device, determine a fault resilient operating mode of the third fault resilient storage device, and map user data from the third fault resilient storage device to the first rescue space and the second rescue space based on determining the fault resilient operating mode. The volume manager may be further configured to map a first block of the user data to the first rescue space, and map a second block of the user data to the second rescue space. The user data may include a strip of data, and the volume manager may be further configured to map a first portion of the strip of data to the first rescue space. The first portion of the strip of data may include a number of data blocks based on a size of the strip of data and a size of the data blocks. The number of data blocks may be further based on a total number of storage devices in the storage array.

A method of operating a storage array may include determining a first parameter of a first fault resilient storage device of the storage array, determining a second parameter of a second fault resilient storage device of the storage array, and determining a quality-of-service (QoS) of the storage array based on the first parameter and the second parameter. The method may further include adjusting the first parameter based on the QoS. The first parameter may be adjusted automatically based on monitoring the first parameter. The first parameter may be adjusted automatically based on monitoring the second parameter. The first parameter may be adjusted by configuring a component of the storage array. The first parameter may be adjusted by controlling the operation of a component of the storage array. The first parameter may include one of a number of storage devices in the storage array, a number of data blocks in a strip of user data for the first fault resilient storage device, a write method for redirecting data from the first fault resilient storage device to the second fault resilient storage device, a number of faulty storage devices supported by the storage array, or a storage capacity of the first fault resilient storage device.

A system may include a storage array including a first fault resilient storage device, a second fault resilient storage device, and a volume manger configured to determine a first parameter of a first fault resilient storage device, determine a second parameter of a second fault resilient storage device, and determine a quality-of-service (QoS) of the storage array based on the first parameter and the second parameter. The volume manger may be further configured to adjust the first parameter based on the QoS. The volume manger may be further configured to adjust the first parameter automatically based on monitoring the first parameter. The volume manger may be further configured to adjust the first parameter automatically based on monitoring the second parameter.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments in accordance with the disclosure, and, together with the description, serve to explain the principles of the present disclosure.

FIG. 2A illustrates a table of some possible fault conditions that may be encountered by an embodiment of a fault resilient storage device in accordance with example embodiments of the disclosure.

FIG. 2B illustrates a table of some example embodiments of fault resilient modes and associated space types that may be implemented by a storage device in accordance with example embodiments of the disclosure.

FIG. 2C illustrates a table of some example embodiments of commands and subcommands that may be implemented by a storage device in accordance with example embodiments of the disclosure.

FIG. 2D illustrates a table of commands that a storage device in accordance with example embodiments of the disclosure may implement through an API.

DETAILED DESCRIPTION

Overview

Figure 1:
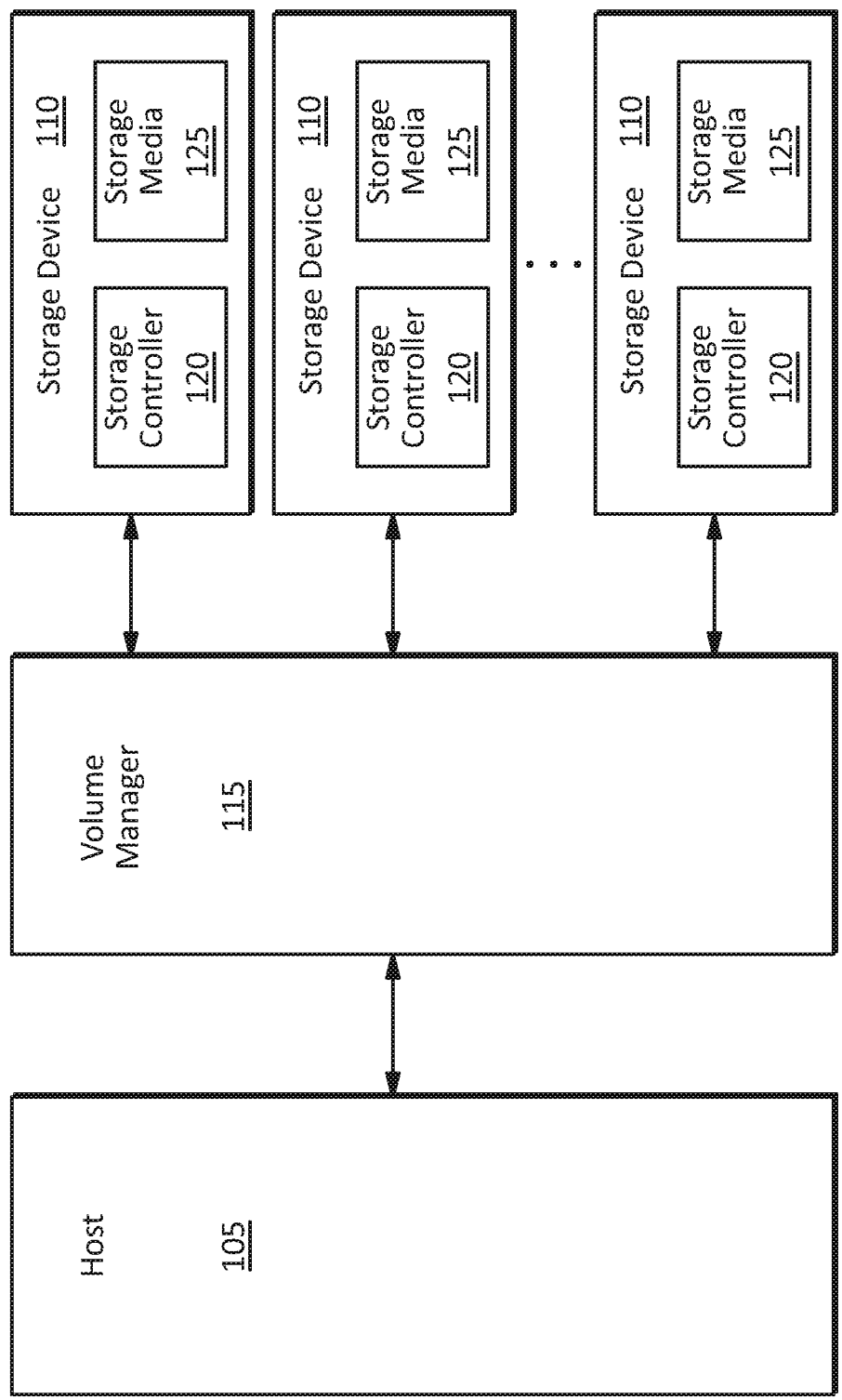
FIG. 1 illustrates an embodiment of a storage system in accordance with example embodiments of the disclosure.

Some of the principles in accordance with example embodiments of the disclosure relate to storage devices that may continue to operate in one or more fault resilient modes in case of a fault of the storage device. For example, a storage device may continue to operate in a limited manner that may enable a storage system to recover quickly and/or efficiently from the fault of the storage drive.

In some embodiments, a storage device may implement any number of the following fault resilient (FR) modes:

Some embodiments may implement a power cycle mode which may involve self-healing based on power cycling the storage device.

Some embodiments may implement a reformat mode which may involve self-healing based on formatting all or a portion of the storage device.

Some embodiments may implement a reduced capacity read-only mode in which a first portion of the storage space of the storage device may operate normally, and a second portion may operate as read-only storage space.

Some embodiments may implement a reduced capacity mode in which a first portion of the storage space of the storage device may operate normally, and a second portion may not be available for input and/or output (I/O) operations.

Some embodiments may implement a reduced performance mode in which one or more aspects of the performance of the storage device may be reduced.

Some embodiments may implement a read-only mode in which data may be read from, but not written to, the storage device.

Some embodiments may implement a partial read-only mode in which a first portion of the storage space of the storage device may operate as read-only storage space, and a second portion may not be available for normal input and/or output (I/O) operations.

Some embodiments may implement a temporary read-only mode in which data may be read from, but not written to, the storage space of the storage device, which may be temporarily valid, and may become invalid.

Some embodiments may implement a temporary partial read-only mode in which data may be read from, but not written to, a first portion of the storage space of the storage device, which may be temporarily valid, and may become invalid. A second portion may not be available for input and/or output (I/O) operations.

Some embodiments may implement a vulnerable mode in which the storage device may not be available for input and/or output (I/O) operations.

Some embodiments may implement a normal mode in which the storage device may operate normally.

In some embodiments, a storage device may implement one or more commands which may be used by a host to determine and/or manage one or more features of the storage device. For example, in some embodiments, a storage device may implement a namespace capacity management command which may include a resize and/or zero-size subcommand.

The principles disclosed herein have independent utility and may be embodied individually, and not every embodiment may utilize every principle. However, the principles may also be embodied in various combinations, some of which may amplify the benefits of the individual principles in a synergistic manner.

Storage Systems

FIG. 1 illustrates an embodiment of a storage system in accordance with example embodiments of the disclosure. The embodiment illustrated in FIG. 1 may include a host 105 and one or more storage devices 110. Some or all of the one or more storage devices 110 may be connected directly to the host 105, and some or all of the one or more storage devices 110 may be connected to the host 105 through a volume manager 115 as shown in FIG. 1. Each storage device 110 may include a storage controller 120 (or "control circuit") and a storage media 125. In some embodiments, a storage device 110 may experience an internal fault condition, and the storage device may exhibit various fault resilient behaviors, as discussed in further detail below, to mitigate the system-level impact of the fault condition.

The one or more storage devices 110 may be implemented with any type of storage apparatus and associated storage media including solid state drives (SSDs), hard disk drives (HDDs), optical drives, drives based on any type of persistent memory such as cross-gridded nonvolatile memory with bulk resistance change, and/or the like, and/or any combination thereof. Data in each storage device may be arranged as blocks, key-value structures, and/or the like, and/or any combination thereof. Each storage device 110 may have any form factor such as 3.5 inch, 2.5 inch, 1.8 inch, M.2, MO-297, MO-300, Enterprise and Data Center SSD Form Factor (EDSFF) and/or the like, using any connector configuration such as Serial ATA (SATA), Small Computer System interface (SCSI), Serial Attached SCSI (SAS), U.2, and/or the like, and using any storage interface and/or protocol such as Peripheral Component Interconnect (PCI), PCI express (PCIe), Nonvolatile Memory Express (NVMe), NVMe-over-Fabrics (NVMe-oF), Ethernet, InfiniBand, Fibre Channel, and/or the like. Some embodiments may be implemented entirely or partially with, and/or used in connection with, a server chassis, server rack, dataroom, datacenter, edge datacenter, mobile edge datacenter, and/or any combinations thereof, and/or the like.

Any or all of the host 105, volume manager 115, storage controller 120, and/or any other components disclosed herein may be implemented with hardware, software, or any combination thereof, including combinational logic, sequential logic, one or more timers, counters, registers, state machines, complex programmable logic devices (CPLDs), field programmable gate arrays (FPGAs), application specific integrated circuits (ASICs), complex instruction set computer (CISC) processors and/or reduced instruction set computer (RISC) processors, and/or the like executing instructions stored in volatile memories such as dynamic random access memory (DRAM) and/or static random access memory (SHAM), nonvolatile memory such as flash memory and/or the like, as well as graphics processing units (OPUs), neural processing units (NPUs), and/or the like.

Although the inventive principles are not limited to any particular implementation details, for purposes of illustration, in some embodiments, each storage device 110 may be implemented as an SSD in which the storage media may be implemented, for example, with not AND (NAND) flash memory, and each storage controller 120 may implement any functionality associated with operating the SSD including a flash translation layer (FTL), a storage interface, and any functionality associated with implementing the fault resilient features disclosed herein. The smallest erasable unit in the storage device 110 may be referred to as a "block" and the smallest writeable unit in the storage device 110 may be referred to as a "page".

The storage media 125 may have a retention period (which may depend on the usage history of the storage media 125, and, as such, may vary within the storage media 125); data that has been stored longer than the retention period (i.e., data having an age exceeding the retention period) may become unreliable and may be said to have expired. Data may be stored in the storage media 125 using an error correcting code, which may be, e.g., a block code. When data is read from the storage media 125, a quantity of raw data, referred to as a code block, may be read from the storage media 125, and an attempt to decode it may be made. If the attempt fails, additional attempts (e.g., read retrials) may be made. With use, a portion, e.g., a block, of the storage media 125 may degrade to a point that the retention period becomes unacceptably short, and the block may be classified as a "bad block". To avoid allowing this circumstance to render the entire storage media 125 inoperable, reserve space, referred to as "bad block management reserve space" may be present (e.g., included in each flash memory die or in each flash memory plane), and the controller 120, or another controller internal to the flash memory die or to the flash memory plane may begin to use a block in the reserve and cease to use the bad block.

The operations and/or components described with respect to the embodiment illustrated in FIG. 1, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components may be illustrated as individual components, in some embodiments, some components shown separately may be integrated into single components, and/or some components shown as single components may be implemented with multiple components.

Fault Conditions

FIG. 2A illustrates a table of some possible fault conditions that may be encountered by an embodiment of a fault resilient storage device in accordance with example embodiments of the disclosure. Each fault condition (or "fault state") may be labeled with a case identifier ("Case ID") in the first column. The second column may indicate an operation status of the storage in the fault state. The third column of the table may indicate, for each case, whether valid user data remain available. The fourth column of the table may indicate whether the storage device 110 may eventually be returned to full functionality, for example, by reformatting the storage media 125.

Case 1 may include a fault condition in which the storage device 110 may no longer be capable of performing read or write operations, and that may not be resolved by cycling power and/or reformatting the storage media. A state in which the storage device 110 behaves in this manner may have various sub-states, with, e.g., each sub-state corresponding to a different failure mechanism. Such a state, or fault condition (in which the storage device 110 is no longer capable of performing read or write operations, and that may not be resolved by cycling power or reformatting the storage media) may be caused, for example, by a portion of the controller's firmware becoming corrupted (in which case it may be possible for the controller to restart into a safe mode, in which the corrupted instructions may not be executed) or by a failure of a processing circuit in the storage device 110 (e.g., the failure of a processing circuit that manages interactions with the storage media but is not responsible for communications with the host 105). When a fault condition of this type occurs, the storage device 110 may respond to a read or write command from the host 105 with an error message.

Case 2 may include a fault condition (i) in which the storage device 110 may no longer be capable of performing read or write operations and (ii) from which recovery may be possible by cycling the power of the storage device 110, by reformatting the storage media (e.g., nonvolatile memory (NVM)), by re-loading firmware, and/or the like. Such a fault condition may be caused, for example, by a program execution error of the controller 120 of the storage device 110 (e.g., a pointer that is out of range as a result of a bit flip in random-access memory (RAM) of the controller 120, or an instruction that is incorrect, as a result of a bit flip). If the program execution error has not caused the controller 120 to write incorrect data to the storage media 125 (e.g., if the program execution error occurred since the most recent write to storage media by the controller), then power cycling the storage device may be sufficient to restore the storage device 110 to normal operation. If the program execution error has caused the controller 120 to write erroneous data to the storage media 125, then reformatting the storage media 125, and/or re-loading firmware may be sufficient to restore the storage device 110 to normal operation.

Case 3 may include a fault condition that may be mitigated by operating the storage device 110 in a read-only mode, and for which reformatting the storage media 125 may not restore full functionality. Examples of such faults may include (i) a temperature sensor failure, and (ii) a portion of the storage media 125 having transitioned to a read-only mode. In the case of the temperature sensor failure, the failure may be detected by determining that a temperature sensor reading is out of range (e.g., has exceeded a threshold temperature), and in such a case the risk of overheating of the storage device 110 may be reduced by avoiding write operations, which may dissipate more power than read operations. The transitioning to a read-only mode of a portion of the storage media 125 may occur, for example, for flash memory storage media 125, if a flash memory plane or die exhausts a bad block management reserve space used for run time bad block management. For example, the storage device 110 may, while attempting to performing a read operation, make an unsuccessful attempt to decode a data item, determine that the block storing the data is a bad block and upon moving the data from the bad block to the bad block management reserve space, determine that the remaining bad block management reserve space is less than a threshold size and therefore insufficient to ensure the reliability of the plane or die. The storage device 110 may then determine that bad block management is no longer being performed, and transition to a read-only mode. In some embodiments, data item may refer to any quantity of data being processed in one operation, e.g., the data resulting from decoding a code block may be a data item.

Case 4 may include fault condition that may be mitigated by operating the storage device 110 in a write-through mode. For example, if a power supply backup capacitor in the storage device 110 fails, the device may, in response to a write command received from the host, complete the write to the storage media 125 before sending a command completion to the host 105, so that if power fails before the write to the storage media 125 has been completed, the host is not incorrectly informed that the write was completed successfully. Operating in the write-through mode may result in a reduction of performance (e.g., in terms of throughput and/or latency).

Case 5 may include a fault condition that may be mitigated by operating the storage device 110 in a manner that reduces power dissipation. For example, in the case of a temperature sensor failure, the storage device 110 may operate in a read-only mode as mentioned above, or it may reduce the rate at which operations (e.g., write operations, which may dissipate more power than read operations) may be performed, to reduce power dissipation in the storage device 110. For example, the storage device 110 may perform a first write to the storage media, then wait, during an interval corresponding to the reduced performance (the waiting resulting in a decrease in the rate at which write operations are performed), and then perform another (e.g., a second) write to the storage media.

Case 6 may include a fault condition that may be mitigated by operating the storage device 110 in a read-only mode, and for which reformatting the storage media 125 may restore full functionality.

Fault Resiliency

Based on one or more fault conditions such as those exemplified by the cases listed in PG. 2A, in some embodiments, various levels of fault resiliency may be implemented by a storage device 110 in accordance with example embodiments of the disclosure. For example, some embodiments may implement a fully resilient mode, a partially resilient mode, and a vulnerable mode. In the fully resilient mode, the storage device 110 may operate with self-healing features, and the storage device 110 may be capable of recovering full functionality (although the user data in the device may be lost) by resetting operations such as power cycling, re-loading firmware, or formatting of the storage media 125.

In the partially resilient mode, the storage device 110 may operate with lower performance, reduced capacity, or reduced capability, when a fault condition exists. For example, as mentioned above, if a power supply backup capacitor fails, writes may be completed (e.g., command completions may be sent to the host 105) only after data is written to the storage media 125 (i.e., synchronous writes may be performed), slowing the operation of the storage device 110, and reducing its performance. The user data may be preserved in this circumstance. As another example, storage device 110 may operate with reduced capacity if the reserve space for bad block management run time bad block (RTBB) is exhausted. In this circumstance, the affected dies in the storage device 110 may be excluded from the disk space and the overall disk capacity may be reduced. The user data on the lost space may be lost. For example, if a set in IO determinism or a zone in a zoned namespace is no longer capable of accepting new data writes, the set or the zone may be excluded from disk space but the remaining disk space may remain available for read and write operations. The user data on the zone or set may be lost.

The storage device 110 may operate with reduced capability, for example, if a storage device 110 does not allow write operations, and switches to a read-only mode. In some embodiments, the storage device 110 may be capable of operating in two types of read-only mode: a sustainable read-only mode (which may be referred to as a "first read-only mode"), and an unsustainable read-only mode (which may be referred to as a "second read-only mode"). In the sustainable read-only mode, the storage device 110 may continue to serve read requests beyond the retention period of the storage media 125. The unsustainable read-only mode may be employed, for example, when it may not be feasible to operate in the sustainable read-only mode, e.g., when there is insufficient unused storage space to set up a rescue space. When transitioning to the unsustainable read-only mode, the storage device 110 may send to the host 105 a notification that the storage device 110 is operating in the second (unsustainable) read-only mode, and that data items stored in the storage device 110 may be allowed to expire (e.g., at the end of their respective retention periods). In the unsustainable read-only mode, the storage device 110 may continue to serve read requests during the retention period of the storage media 125, and, if the storage device 110 encounters data integrity issues (as detected, for example, by one or more unsuccessful attempts to decode data during read operations), the storage device 110 may report the invalid data region.

A storage device 110 operating in the vulnerable mode may be incapable of performing normal read and/or write operations, and may perform a graceful exit, for example, by continuing to receive commands from the host and returning errors.

Thus, in some embodiments, a storage device having one or more fault resilient features in accordance with example embodiments of the disclosure may extend and/or organize the features so that a host may utilize them systematically, and the device may continue to operate in some capacity despite a fault condition. In some embodiments, for example, if the storage device is used for a RAID (Redundant Array of Independent (or Inexpensive) Drives) or RAIN (Redundant Array of Independent Nodes), and a node fails, the system may recover the data by copying the data from the accessible space of the storage device without calculating the stripe parity.

Logical Block Address Space Types

In some embodiments, various logical block address (LBA) space types may be implemented by a storage device having fault resiliency features in accordance with example embodiments of the disclosure. These LBA space types may be used, for example, by a storage device such as that illustrated in FIG. 1. Some examples of LBA space types may include performing space (P), underperforming space (UP), read-only space (RO), volatile read-only space (VRO), and inaccessible space (IA). In some embodiments, an LBA space may also refer to any unit of storage space such as a page, a partition, a set, a zone, and/or the like.

Performing (P) space may include LBA space containing valid data, which may be capable of being read and written in a normal manner without sacrificing performance. Data in performing space may be valid.

Underperforming (UP) space may include LBA space containing valid data, which may be capable of being read and written in a normal manner, but with degraded performance (e.g., degraded write performance).

Read-only (RO) space may include LBA space containing valid data, which may be read-only. For example, a storage device may refuse to write data received from a host and/or may respond with error messages to write commands from the host directed to this type of LBA space. The data in read-only space may remain valid for a period of time exceeding the retention period.

Volatile read-only (VRO) space may include read-only space, and the storage device may respond with error messages to write commands from a host directed to this type of LBA space. Data in this type of LBA space may be temporarily valid, and may become invalid when it expires, i.e., when the age of the data in its storage media reaches the retention period of the storage media.

Inaccessible (IA) space may include LBA space containing invalid data, which may not be accessible from the host.

Fault Resilient Modes

In some embodiments, LBA space types may be used, for example, to implement some embodiments of fault resilient modes. FIG. 2B illustrates a table of some example embodiments of fault resilient modes and associated LBA space types that may be implemented by a storage device in accordance with example embodiments of the disclosure. The Mode column of the table illustrated in FIG. 2B may include a fault resilient mode number and a name which may be used to identify the mode, for example, in an application programming interface (API) through which one or more features of a storage device may be accessed in accordance with example embodiments of the disclosure. The columns labeled as P, UP, RO, VRO, and IA in the table illustrated in FIG. 2B may indicate an amount of performing (P), underperforming (UP), read-only (RO), volatile read-only (VRO), and inaccessible (IA) LBA space, respectively, that may be used in the corresponding mode.

In some embodiments, the modes illustrated in FIG. 2B may be invoked, for example, by a host through an API. In some embodiments, a host may query the storage device using a get feature command as described below. In some implementations, modes identified with an asterisk (*) may provide a host with detailed information about each type of LBA space used by the mode in response to a get feature command. In some implementations, information about the LBA space used by the other commands may be implicit. For example, in the power cycle mode (Mode 1), all memory may be of the performing (P) type. In some embodiments, however, other combinations of LBA space types, and/or portions thereof, may be used.

In some embodiments, a storage device may implement any number of the following fault resilient modes. For example, a device manufacturer may implement different combinations of these and other fault resilient modes in different products.

A power cycle mode (Mode 1) may involve self-healing based on power cycling the storage device. For example, a storage device may experience a fault condition based on one or more flipped bits in memory such as SRAM or DRAM. A flipped bit may be caused, for example, by aging, heating, and/or radiation due to an antenna or high elevations above sea level which may interfere with memory cells. A storage device with a fault resilient power cycle mode may have self-healing capabilities such that power cycling the storage device (e.g., removing then reapplying power) may reset the current state and restore the failed SSD to a normal state. In this case, one or more inflight commands in a submission queue may be lost. Whether the user data of the storage device remains valid may depend on implementation details such as the partitioning of the device, the extent to which different circuits of the storage controller are reset, and/or the like. In some embodiments, in a power cycle mode, the entire storage space of the storage device (100 percent) may operate normally (e.g., as performing (P) space).

A reformat mode (Mode 2) may involve self-healing based on formatting all or a portion of the storage device. In some embodiments, formatting the storage device may reset its current state and restore the failed storage device to its normal state. However, depending on the implementation details (e.g., quick format, full format, partitioning details, and/or the like) all data on the disk may be lost. In some embodiments, in a reformat mode, the entire storage space of the storage device (100 percent) may operate normally (e.g., as performing (P) space).

In a reduced capacity read-only mode (Mode 3), a first portion of the storage space (e.g., X percent) of the storage device may operate normally (e.g., as performing (P) space), and a second portion (e.g., (100-X) percent) may operate as read-only (RO) storage space. Thus, the size of the performance (P) space in the storage device may be reduced, and the storage device may behave like a normal drive with respect to that space, but the read-only (RO) type of space may not be writable. In some embodiments, the storage device may provide a list of LBA ranges for the performance (P) and/or read-only (RO) spaces to a host, for example, in response to a get feature command. If the storage device supports the IO determinism, the LBA range may represent a set. If the storage device supports Zoned Namespaces (ZNS), the LBA range may represent a zone. In some embodiments, the storage device may also provide information about address ranges for sets and/or ZNS in response to a get feature command.

In a reduced capacity mode (Mode 4), a first portion of the storage space (e.g., X percent) of the storage device may operate normally (e.g., as performing (P) space), and a second portion (e.g., (100-X) percent) may be inaccessible (IA). Thus, the size of the performance (P) space in the storage device may be reduced, and the storage device may behave like a normal drive with respect to that space, but inaccessible (IA) space may not be available for normal IOs. For example, if an RTBB is exhausted, the problematic die may be excluded from the disk space, and thus, the overall disk capacity may be reduced. The storage device may provide a list of LBA ranges for the performance (P) and/or inaccessible (IA) type of space. If the storage device supports the IO determinism, the LBA range may represent a set. If the storage device supports ZNS, the LBA range may represent a zone. In some embodiments, the storage device may provide information about the LBA ranges, sets, zones, and/or the like, in response to a get feature command.

In a reduced performance mode (Mode 5) one or more aspects of the performance of the storage device may be reduced. For example, the storage device may perform normal operations, but at reduced throughput and/or latency. In some embodiments, a storage device may include one or more back-up capacitors that, in the event of a loss of the main power supply, may provide power to the storage device for a long enough period of time to enable the storage device to complete a write operation. If one or more of these back-up capacitors fail, the storage device may not notify a host that a write operation is complete until after the data is written to the media. (This may be referred to as a synchronous write operation.) This may reduce the input and/or output operations per second (IOPS) and/or increase latency, thereby reducing the performance of the storage device. Thus, in some embodiments, reduced performance mode may operate with 100 percent underperforming (UP) space. Depending on the implementation details, some or all of the user data may remain valid. In some embodiments, the storage device may provide speculative performance information to a host which may enable the host to make decisions on sending write data to the storage device in a manner that may mitigate the system level impact of the fault condition.

In a read-only mode (Mode 6), the storage device may only allow read operations and may block external write operations. Depending on the implementation details, data in read-only space may remain valid, for example, after the retention period. Read-only mode may operate with 100 percent read-only (RO) space.

In a partial read-only mode (Mode 7), a first portion of the storage space (e.g., X percent) of the storage device may operate as read-only (RO) space, and a second portion (e.g., (100-X) percent) may be inaccessible (IA) space. Thus, the storage device may only allow read operations and external write operations may be prohibited in the first portion of the storage space. Depending on the implementation details, data in the read-only space may still valid, for example, after the retention period. The storage device may provide a list of LBA ranges for the read-only (RO) and/or inaccessible (IA) types of space. If the storage device supports the IO determinism, the LBA range may represent a set. If the storage device supports ZNS, the LBA range may represent a zone. In some embodiments, the storage device may provide information about the LBA ranges, sets, zones, and/or the like, in response to a get feature command.

In a temporary read-only mode (Mode 8), data may be read from the storage space of the storage device, which may operate with 100 percent VRO space, but external writes may be prohibited, Data in this space may be temporarily valid but may become invalid after the retention period.

In a temporary partial read-only mode (Mode 9), data may be read from a first portion (e.g., X percent) of the storage space of the storage device, which may operate as VRO space, while external writes may be prohibited. A second portion (e.g., (100-X) percent) may be inaccessible (IA) space. Data in the first portion may be temporarily valid but may become invalid after the retention period. If the storage device supports the IO determinism, the LBA range may represent a set. If the storage device supports ZNS, the LBA range may represent a zone. In some embodiments, the storage device may provide information about the LBA ranges, sets, zones, and/or the like, in response to a get feature command.

In a vulnerable mode (Mode 10), the storage device may not be available for I/O operations. However, it may continue to receive commands from the host and return errors.

In a normal mode (Mode 11), the storage device may operate normally.

Commands

In some embodiments, a storage device in accordance with example embodiments of the disclosure may implement one or more commands which may be used, for example, by a host to query the storage device and/or manage one or more features of the storage device. FIG. 2C illustrates a table of some example embodiments of commands and subcommands that may be implemented by a storage device in accordance with example embodiments of the disclosure. The subcommand column of the table illustrated in FIG. 2C may indicate a name which may be used to identify the subcommand, for example, in an API through which the commands, and responses thereto, may be passed.

A get feature command, which may include a subcommand as shown in the table illustrated in FIG. 20, may be passed from a host to a storage device, which may return a response thereto. In some embodiments, a storage device may respond as follows to a get feature command based on the subcommand.

A resiliency type subcommand (FR_INFO_RESILIENCy_TYPE) may return a type of fault resiliency in case of a failure. For example, the storage device may indicate which of the fault resilient modes illustrated in FIG. 2B the device has selected to operate in based on the fault condition it has encountered.

A retention period subcommand (FR_INFO_RETENTION_PERIOD) may return an average retention period of the data without reprogramming the storage media. In some embodiments, this may be the upper-bound of retention time for data in the storage media from the time of the failure. This subcommand may be used, for example, with temporary read-only mode (Mode 8) and/or temporary partial read-only mode (Mode 9).

An earliest expiry subcommand (FR_INFO_EARLIEST_EXPIRY) may return a maximum time remaining for data integrity. In some embodiments, this may be the lower-bound of retention time for data in the storage media from the time of the failure. The unit of time may be determined, for example, based on a patrol period. This subcommand may be used, for example, with temporary read-only mode (Mode 8) and/or temporary partial read-only mode (Mode 9).

An IOPS subcommand (FR_INFO_IOPS) may return a percentage of the maximum available IOPS the storage device may be able to handle based on the fault condition. This subcommand may be used, for example, with reduced performance mode (Mode 5).

A bandwidth subcommand (FR_INFO_BW) may return a percentage of the maximum available bandwidth the storage device may be able to handle based on the fault condition. This subcommand may be used, for example, with reduced performance mode (Mode 5).

A space subcommand (FR_INFO_SPACE) may return an amount of storage space that may be available in the storage device based on the fault condition. This subcommand may be used, for example, with reduced capacity read-only mode (Mode 3) and/or reduced capacity mode (Mode 4).

A namespace capacity management command, which may include a subcommand as shown in the table illustrated in FIG. 2C, may be passed from a host to a storage device, which may respond by performing the action indicated by the subcommand. In some embodiments, a storage device may respond as follows to a namespace capacity management (NCM) command based on the subcommand. In some embodiments, a namespace may be implemented as a quantity of non-volatile memory (NVM) that may be formatted into logical blocks.

A resize command (FR_NAMESPACE_RESIZE) may cause the storage device to resize a namespace based on one or more parameters that may be included with the command. In some embodiments, this subcommand may apply to storage device that may support two or more namespaces. In some embodiments, the namespaces may support NVMe resizing.

A zero-sized namespace command (FR_NAMESPACE_ZERO_SIZE) may cause the storage device to reduce the size of a rescue space to zero.

Application Programming Interface

In some embodiments, as mentioned above, a storage device in accordance with example embodiments of the disclosure may implement an API to enable a host to query the storage device and/or manage one or more features of the storage device. FIG. 2D illustrates a table of commands that a storage device in accordance with example embodiments of the disclosure may implement through an API. Some embodiments may include a hierarchy of enumerated constants, within the category of fault resilient features, that the storage device may employ to respond. As illustrated in FIG. 2D, the hierarchy may include a first level, including a fully resilient status, a partially resilient status, and a vulnerable status. Sub-statuses, and sub-sub-statuses may also be defined. For example, as illustrated in FIG. 2D, the partially resilient status may include a first sub-status indicating a loss of capability, and the first sub-status may include a first sub-sub-status, indicating operation in the sustainable read-only mode, and a second sub-sub-status, indicating operation in the unsustainable read-only mode. In some embodiments, an API may be implemented, for example, using NVMe commands.

A feature command (FAULT_RESILIENT_FEATURE) may return the fault resilient classes and features in each class that the storage device may support.

A status command (FAULT_RESILIENT_STATUS) may return the status of the storage device after a fault resilient recovery is performed.

A volatile blocks command (FAULT_RESILIENT_VOLATILE_BLOCKS (H)) may return a list of LBA ranges that reach to the retention period in the next H hours. In some embodiments, this may be used to determine the blocks that need to be relocated for unsustainable read-only.

An invalid data blocks command (FAULT_RESiLIENT_iNVALID_DATA_BLOCKS) may return a list of LBA ranges that may become invalid after switching to a fault resilient mode.

Additional Embodiments

Figure 3A:
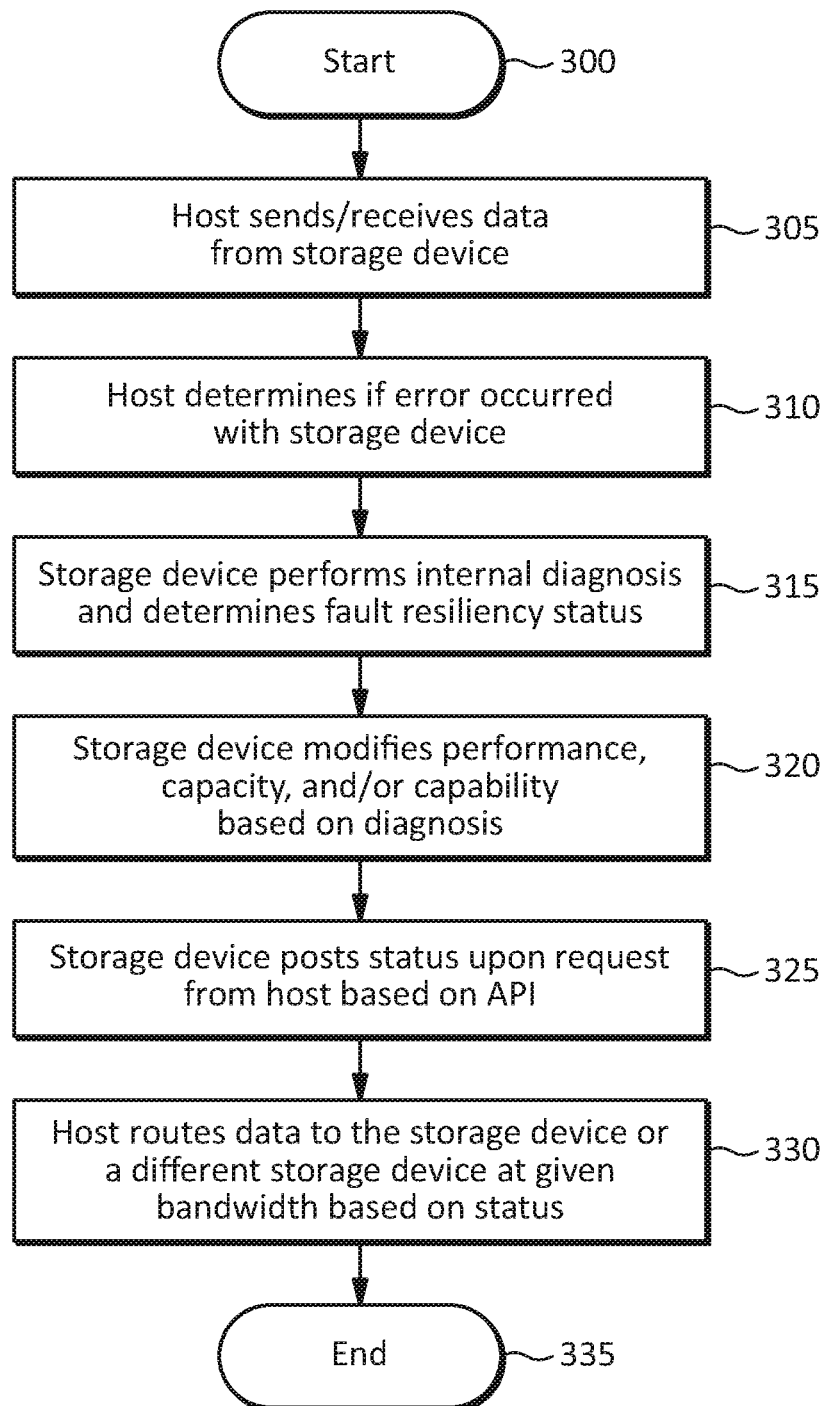
FIG. 3A illustrates a flow chart of an embodiment of a method for operating in a fault resilient mode in accordance with example embodiments of the disclosure.

FIG. 3A illustrates a flow chart of an embodiment of a method for operating in a fault resilient mode in accordance with example embodiments of the disclosure. The method illustrated in FIG. 3A may be implemented, for example, by the systems and/or components illustrated in FIG. 1. The method may begin at operation 300. At operation 305, the host 105 may send or receives data from the storage device 110, at operation 310, the host 105 may determine whether an error has occurred in the storage device 110. At operation 315, the storage device 110 may perform an internal diagnosis and determine its fault resilient status (e.g., fully resilient, partially resilient, or vulnerable). At operation 320, the storage device 110 may modify its performance, capacity, and/or capability (e.g., transitioning to a read-only mode) based on the diagnosis. At operation 325, the storage device 110 may post the status upon request from the host 105 based on an application programming interface (API). At operation 330, the host 105 may route data of a given type to the storage device 110 or to a different storage 110 device at a given bandwidth based on the status. The method may end at operation 335.

Figure 3B:
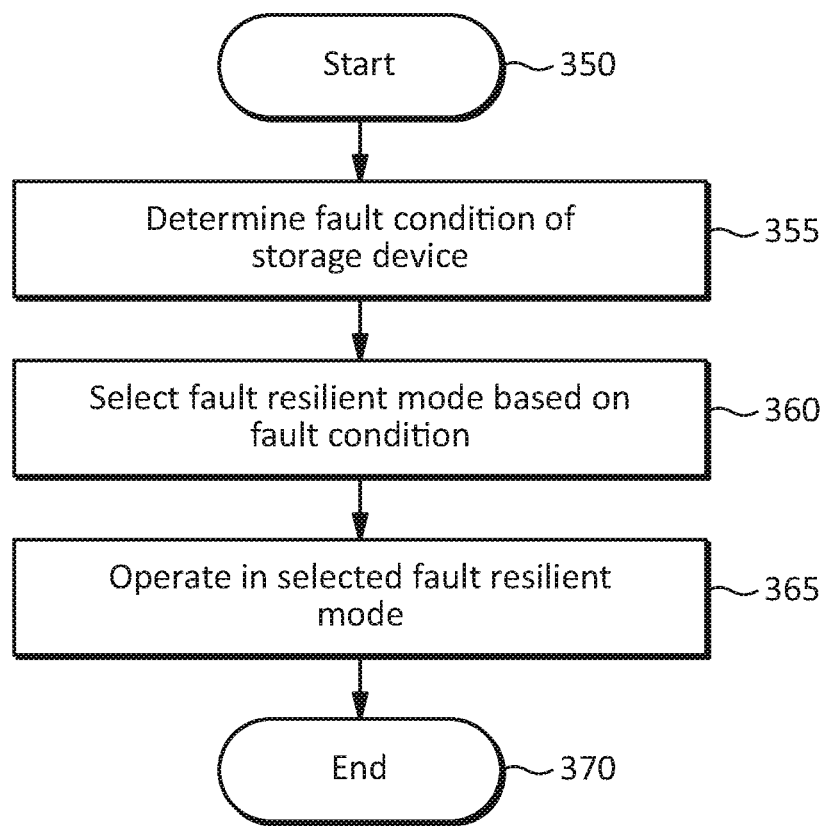
FIG. 3B illustrates a flow chart of an embodiment of a method of operating a storage device in accordance with example embodiments of the disclosure.

FIG. 3B illustrates a flow chart of an embodiment of a method of operating a storage device in accordance with example embodiments of the disclosure. The method may begin at operation 350. At operation 355, the method may determine a fault condition of the storage device. At operation 360, the method may select a fault resilient mode based on the fault condition of the storage device. At operation 365, the method may operate the storage device in the selected fault resilient mode. The method may end at operation 370.

The operations and/or components described with respect to the embodiment illustrated in FIGS. 3A and 3B, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied, Although some components may be illustrated as individual components, in some embodiments, some components shown separately may be integrated into single components, and/or some components shown as single components may be implemented with multiple components.

Any number of embodiments and/or variations on the embodiments disclosed herein may also be constructed, A storage controller such as a field programmable gate array (FPGA) or embedded processor may perform internal block checks and send asynchronous updates to the host 105 on the status of the storage device 110. Events may occur and be transmitted to the host 105 (e.g., temperature, or other parameters internal to the device). The host 105 may poll the storage devices 110 on a predetermined schedule, for example, if there is no device driver feature for providing notification. A storage controller may monitor the historical performance of the storage device 110 and use machine learning to provide predictive analytics (e.g., a likelihood of the storage device being in a given fault resilient state). Commands (e.g., NVMe commands) may be implemented and/or expanded, for example, to report the state of the storage device 110).

In some embodiments, the host may: (i) send different data types (e.g., file types such as image, video, text, or high-priority or low-priority data), based on the status of the storage device 110 (for instance, high priority data or real-time data may not be written to a device that is considered in the partially vulnerable mode); (ii) reduce the transmission rate if the storage device 110 is in a partially vulnerable state and in a lower performance state; (iii) send a reduced total amount of data if the storage device 110 is in a partially vulnerable and lower capacity state; (iv) read data at the greatest rate possible, and/or store the data elsewhere, if the storage device 110 is in a partially vulnerable unsustainable read-only mode, so as to avoid exceeding the retention period (in such a circumstance, the host may calculate the needed data rate based on the amount of data to be copied and on the retention period); (v) ignore data "read" from a vulnerable storage device 110 since it may be erroneous, and delete the data as it is received by the host 105; (vi) temporarily reroute read/write input and output to a cache in a fully resilient storage device 110 that is being power cycled and/or formatted, based on messages that control the timing of such events between the host and the storage devices 110. A storage controller on a partially vulnerable storage device that has had a capacity decrease may filter incoming data writes and only write a portion of that data to the storage device 110. In some cases, the filtering may include compression. Such a storage controller may receive various types of data (e.g., file types such as image, video, text, or high-priority or low-priority data) from a host 105 and filter based on the status of the storage device 110. For instance, the storage controller may determine that high priority data may not be written to a storage device 110 that is in the partially vulnerable mode. The storage controller may send a rejection message to the host 105 and give a reason for the rejection. Alternatively, the storage controller may filter out a certain type of data (e.g., image data) for writing to a partially resilient lower-capacity state storage device 110. For example, if a storage device 110 loses performance (e.g., operates at a reduced write rate), latency-sensitive reads and writes may be rejected.

Fault Resilient System with Fault Resilient Storage Devices

In some embodiments, a RAID-0 system including an array of storage devices 110 and a volume manager 115 may be constructed to accommodate a transition of any of the fault resilient storage devices 110 of the RAID-0 system to a read-only mode. In normal operation, the volume manager 115 may be responsible for striping data across the array of storage devices 110, e.g., writing one strip of each stripe to a respective storage device 110 of the array of storage devices 110. In such a system, when any of the array of storage devices 110 transitions to a read-only mode (indicated as 110A), the RAID-0 system may transition to a second operating mode (which may also be referred to as an emergency mode), and the volume manager 115 for the array of storage devices 110 may (i) allocate a rescue space on each of the remaining, unaffected storage devices 113E (e.g., those that remain in a read-write state) for metadata and rescued user data from faulty storage device 110A, and/or (ii) create and/or maintain a mapping table (which may also be referred to as an emergency mapping table). Rescue space may be pre-allocated statically prior to system operation, dynamically during operation, or in any combination thereof.

The rescue space (which may be indicated as R) on each storage device 110A may be capable of storing n strips, where n=R/(strip size), R=C/M, C may be the capacity of each of the storage devices of the array of storage devices 110, and M may be the total number of storage devices. In some embodiments, the volume manager 115 may be implemented as an independent component, or may be partially or fully integrated into the host, a RAID controller of the RAID-0 system (which may, for example, be housed in a separate enclosure from the host), or in any other configuration. In some embodiments, the volume manager 115 may be implemented, for example, with an FPGA. The RAID-0 system may be self-contained and may virtualize the array of storage devices 110 so that from the perspective of the host the RAID-0 system may appear as a single storage device. In some embodiments, the volume manager may be implemented as a processing circuit (discussed in further detail below) configured (e.g., by suitable software or firmware) to perform the operations described herein as being performed by the volume manager.

Figure 4A:
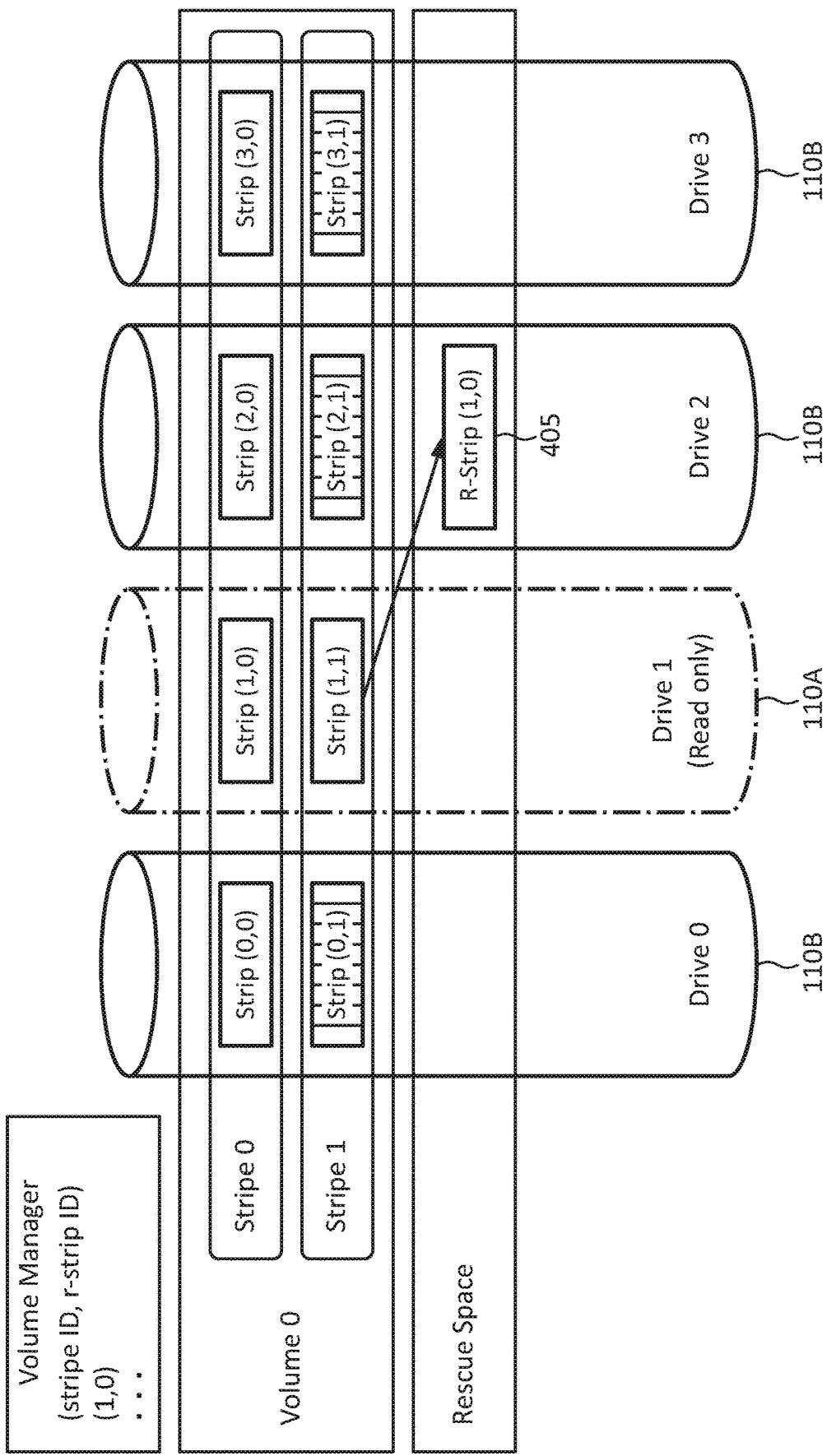
FIG. 4A illustrates a schematic data layout diagram of a RAID-0 system performing a write operation in accordance with example embodiments of the disclosure.

When the RAID-0 system is operating in an emergency mode, and a write command is received from the host 105 requesting that data be written to a stripe of the array of storage devices 110, the volume manager 115 may check the emergency mapping table to determine whether the stripe is registered e.g., whether an entry has already been made for the stripe. If no entry has been made yet (e.g., the stripe is not registered, which may also be referred to as open-mapped), the volume manager 115 may create an entry in the emergency mapping table to indicate where a strip, that ordinarily would have been written to the faulty storage device 110A (the storage device that has transitioned to read-only mode), is to be written. If the emergency mapping table already contains an entry for the stripe, then the entry may be used to determine where to write the strip that ordinarily would have been written to the faulty storage device 110A. In either case, the volume manager 115 may then write each strip, as illustrated in FIG. 4A, to the array of storage devices 110, writing the strip 405 that ordinarily would have been written to the faulty (e.g., read-only) storage device 110A to rescue space in another storage device 110B.

Figure 4B:
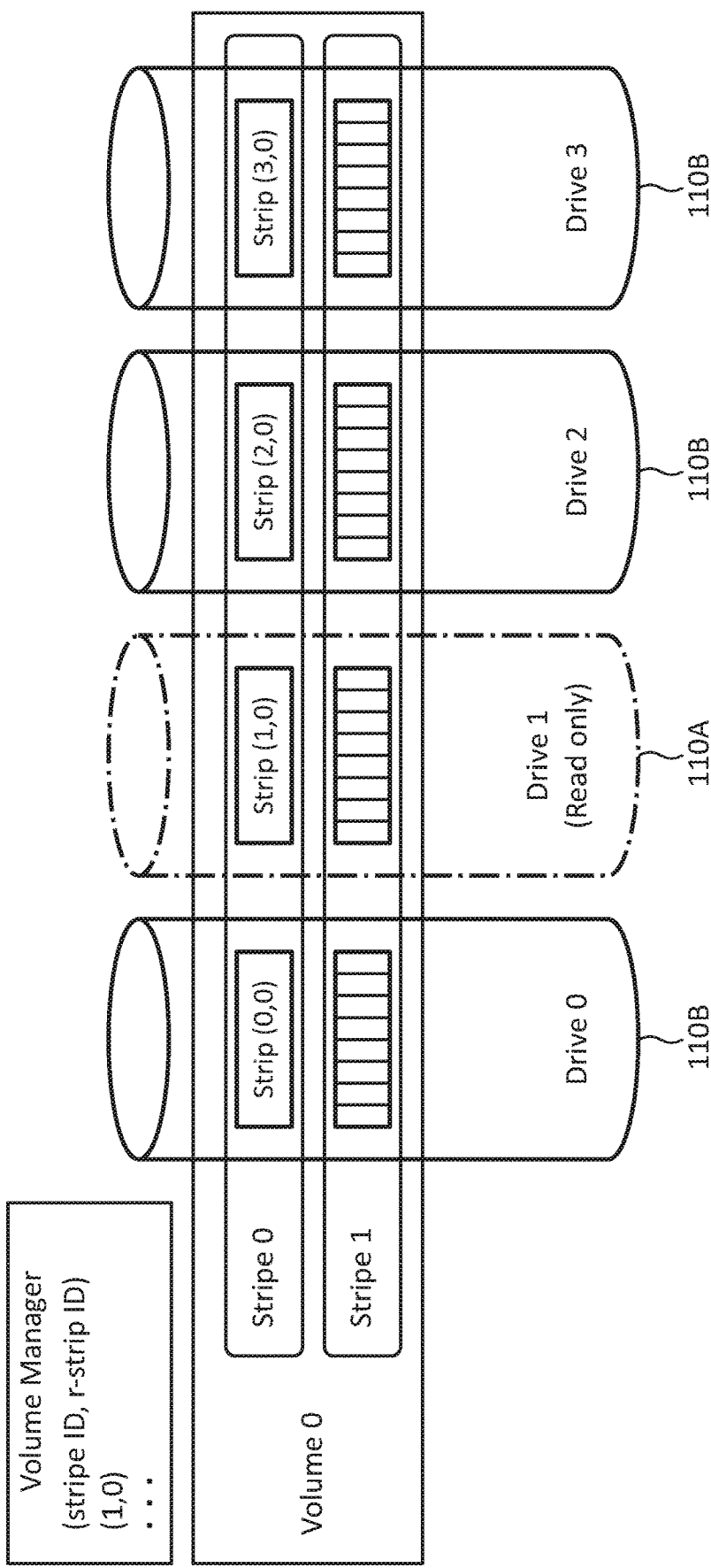
FIG. 4B illustrates a schematic data layout diagram of a RAID-0 system performing a read operation in accordance with example embodiments of the disclosure.

When a read command is received from the host 105 requesting that data of a stripe be read from the array of storage devices 110, the volume manager 115 may check the emergency mapping table to determine whether an entry has been made for the stripe. If no entry has been made, then, as illustrated in FIG. 4B, the volume manager 115 may read the stripe as it would have, in ordinary operation, reading a strip from each of the storage devices 110, including the faulty storage device 110A. If the emergency mapping table contains an entry for the stripe, then the entry may be used to determine where to read the strip that ordinarily would have been read from the faulty storage device 110A.

The remapping of strips that ordinarily would have been written to the faulty storage device 110A may be accomplished, for example, as follows. Each storage device 110 of the array of storage devices 110 may have a drive identification number (or "drive ID"), which may be a number between zero and M−1, where M may be the number of storage devices 110 in the array of storage devices 110. The volume manager 115 may reassign the drive identification numbers, e.g., assign to each unaffected storage device 110B of the array of storage devices 110 an alternate drive identification number to be used for performing read or write operations for registered stripes (read operations for unregistered stripes may continue to use the original drive identification numbers). The following formula (Formula A) may be used to generate the alternate drive identification numbers:

If drive ID<faulty drive ID, new drive ID=((drive ID−1)+$M$)mod($M$−1)

Otherwise, new drive ID=((drive ID−1)+($M$−1))mod($M$−1).    (Formula A)

The effect of Formula A may be (i) to assign, to each storage device having an identification number less than the original drive identification number of the faulty storage device, the respective original drive identification number, and/or (ii) to assign, to each storage device having an identification number greater than the original drive identification number of the faulty storage device, the respective original drive identification number minus one.

Using the alternate drive numbers, a target drive, to which a strip that ordinarily would have been written to the faulty storage device 110A may be written, may be identified (e.g., on a per stripe basis) using the formula Target Drive ID sid % (M−1) where Target Drive ID may be the alternate drive identification number of the target drive, sid may be the stripe identifier of the strip that ordinarily may have been written to the faulty storage device 110, and "%" may be the modulo (mod) operator.

Figure 4C:
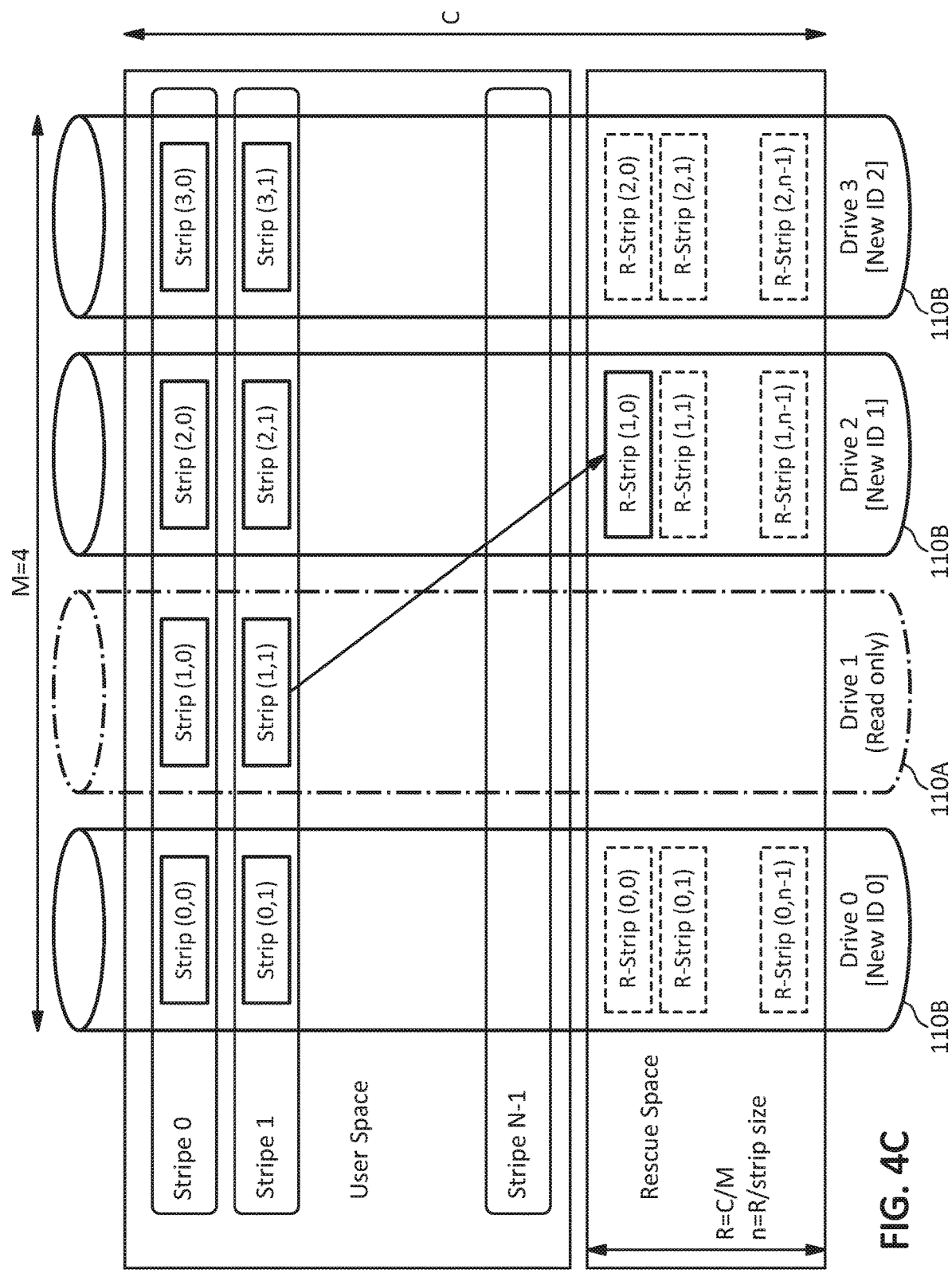
FIG. 4C illustrates a schematic data layout diagram of a RAID-0 system performing a remapping and write operation in accordance with example embodiments of the disclosure.

FIG. 4C is a schematic diagram of an embodiment of a RAID-0 system in accordance with example embodiments of the disclosure. The embodiment illustrated in FIG. 4C may include four fault resilient storage devices 110 (i.e., M=4) in which the storage device identified as Drive 1 has transitioned to a read-only mode. Using Formula A described above, Drive 0 may remain mapped to new Drive ID 0 (e.g., 3 mod 3), Drive 2 may be mapped to new Drive ID 1 (e.g., 4 mod 3), and Drive 3 may be mapped to new Drive ID 2 (e.g., 5 mod 3).

The target drive ID (e.g., for a read or write operation) may be implicitly determined by the equation Target Drive ID Stripe ID % (M−1). For example, if M=4 and Stripe 1 is written. Stripe ID=1, and thus, Target Drive ID=1% 3=1. That is, the target drive may be the storage device 110B with alternate (New) drive identification number 1 (i.e., previous Drive 2). Within the storage device, the rescue space may be split into strips (which may be referred to as rescue strips, or R-Strips) the size of which may be the same as the strip size. In some embodiments, the emergency mapping table may contain an entry for each strip having the format (Stripe ID, R-Strip ID) in which the first element may be the Stripe ID, and the second element may be the R-strip ID on the target drive. For example, an entry of (1,0) in the emergency mapping table may indicate that Strip (1,1) is mapped to R-Strip (1,0) as shown in FIG. 4C.

Figure 5A:
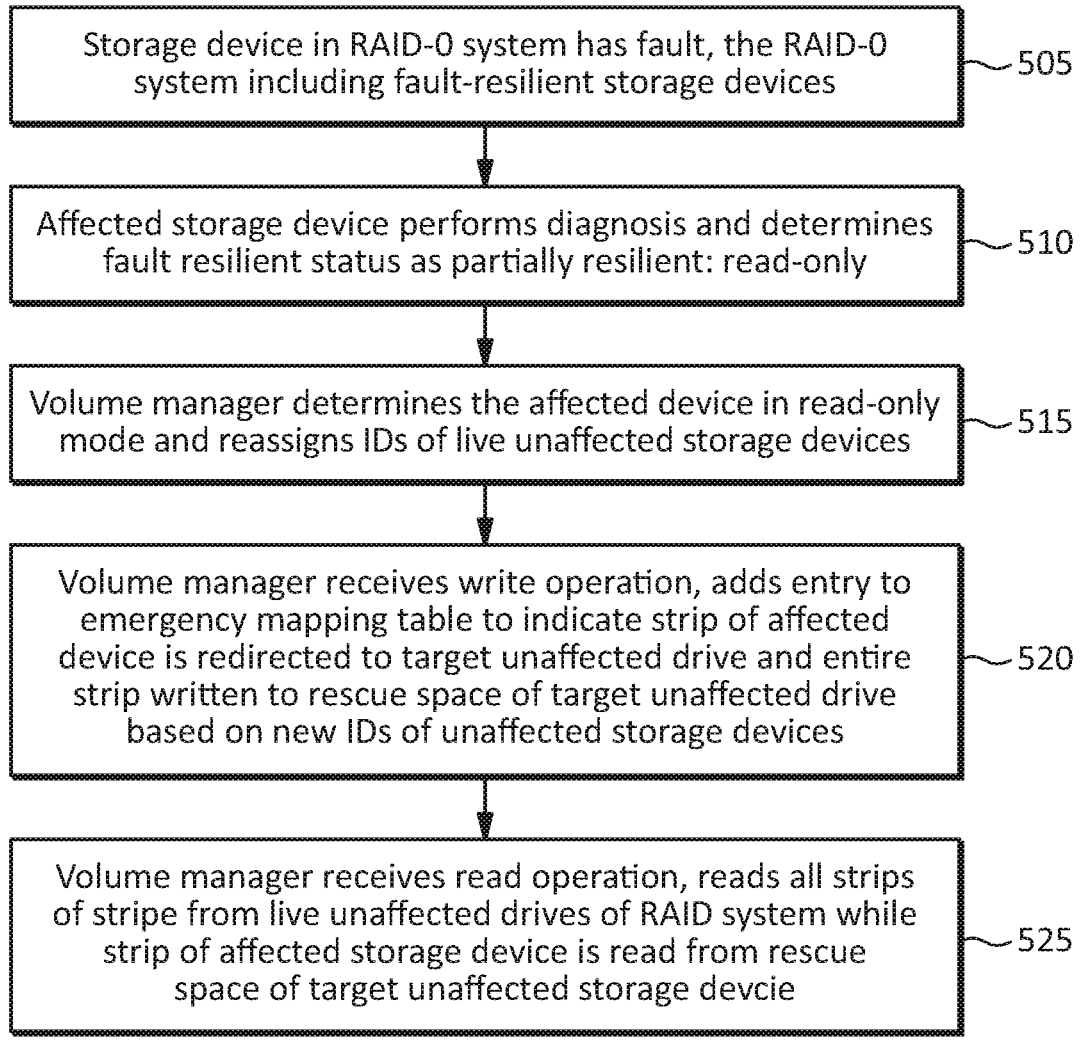
FIG. 5A illustrates a flowchart for a method for operating a RAID-0 system in accordance with example embodiments of the disclosure.

FIG. 5A illustrates a flowchart for a method for operating a RAID-0 system in accordance with example embodiments of the disclosure. At 505, A storage device 110 in a RAID-0 system has a fault and transitions to a read-only mode; at 510, the affected storage device 110 performs an internal diagnosis and determines that its fault resilient status is partially resilient and read-only; at 515, the volume manager 115 determines that the affected storage device 110 is in a read-only mode and reassigns the IDs of ("live") unaffected storage devices; at 520, the volume manager 115 receives a write operation, adds an entry to an emergency mapping table to indicate that the strip of the affected device is redirected to a target (unaffected) storage device 110, and the entire strip is written to a rescue space of the target (unaffected) storage device based on the new drive IDs of the unaffected storage devices; and, at 525, the volume manager 115 receives a read command from the host 105, and reads all strips of a stripe from the live unaffected storage devices 110 of the RAID system while the strip of the affected storage device is read from the rescue space of the target (unaffected) storage device.

Figure 5B:
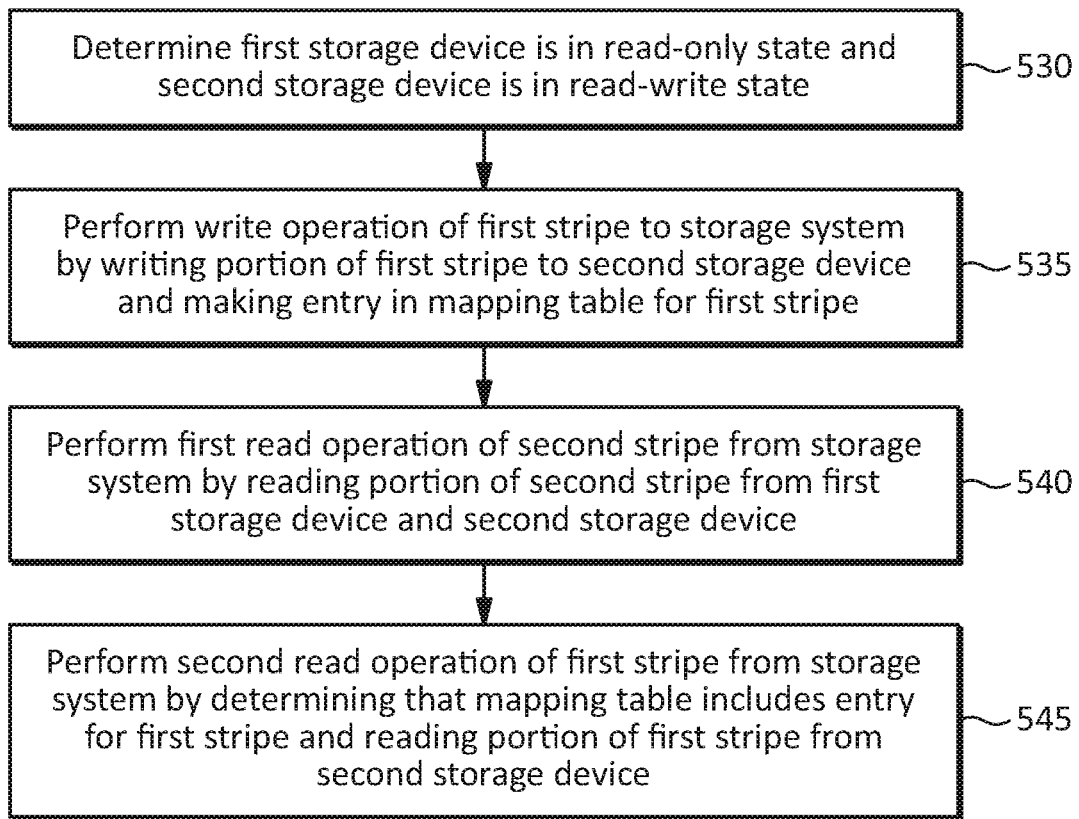
FIG. 5B illustrates a flow chart showing details of a method for operating a RAID-0 storage system in accordance with example embodiments of the disclosure.

FIG. 5B illustrates a flow chart showing details of a method for operating a RAID-0 storage system in accordance with example embodiments of the disclosure. The method includes, at 530, determining that the first storage device is in a read-only state and that the second storage device is in a read-write state; at 535, performing a write operation, of a first stripe, to the storage system, by writing a portion of the first stripe to the second storage device, and making an entry in a mapping table for the first stripe; at 540, performing a first read operation, of a second stripe, from the storage system, by reading a portion of the second stripe from the first storage device and the second storage device; and at 545, performing a second read operation, of the first stripe, from the storage system, by determining that the mapping table includes an entry for the first stripe, and reading a portion of the first stripe from the second storage device.

System with Resilience to N-Device Failures

In some embodiments, a RAID-0 system may be constructed to accommodate the failure of multiple (e.g., N) fault resilient storage devices 110. An example embodiment of such a system may in some ways be constructed and operate in a manner similar to the embodiment described above with respect to FIGS. 4A-4C, but the size of the rescue space R for each storage device may be determined by considering the number N of faulty storage devices 110A the system may accommodate. For example, in some embodiments, a rescue space percentage ratio (e.g., b percent, which may also be referred to as a reservation ratio) may be used to determine the size of the rescue space R for each storage device, where R=(b/100)*C. In some embodiments in which a system has M storage devices and may accommodate N faulty storage devices that may transition to read-only mode, setting b such that N/M<=b/100 may ensure that all data from the N faulty storage devices 110A may be written to rescue space in the remaining unaffected storage devices (which may be referred to as live storage devices). For example, in a system that may have five storage devices and that may accommodate two faulty storage devices that may transition to read-only mode, b may be set to 2/5=40 percent. Thus, the size of the rescue space R for each storage device may be set to R=40/100*C. The rescue space R on each unaffected storage device 110A may be capable of storing n strips, where n=R/(strip size), but in this embodiment, R may be set to R=(b/100)*C. Rescue space may be pre-allocated statically prior to system operation, dynamically during operation, or in any combination thereof.

In a system that may accommodate N fault resilient storage device failures, M' may represent the number of unaffected (e.g., live) storage devices such that M'<=M. In some embodiments, the drive IDs of the unaffected storage devices 110B may be reassigned according to the following formula (Formula B):

If current drive ID>current faulty drive ID new drive ID=((current drive ID−1)+(M'−1))mod (M'−1)

Otherwise new drive ID=((current drive ID−1)+M')mod(M'−1).   (Formula B)

Using the alternate drive numbers, a target storage device for a write operation may be implicitly identified (e.g., on a per stripe basis) using the formula Target Drive ID=sid % (M'−1) where Target Drive ID may be the alternate (new) drive identification number of the target storage device, and sid may be the stripe identifier of the strip that ordinarily may have been written to the faulty storage device 110A, and which may now be written to the target storage device having the Target Drive ID.

Figure 6:
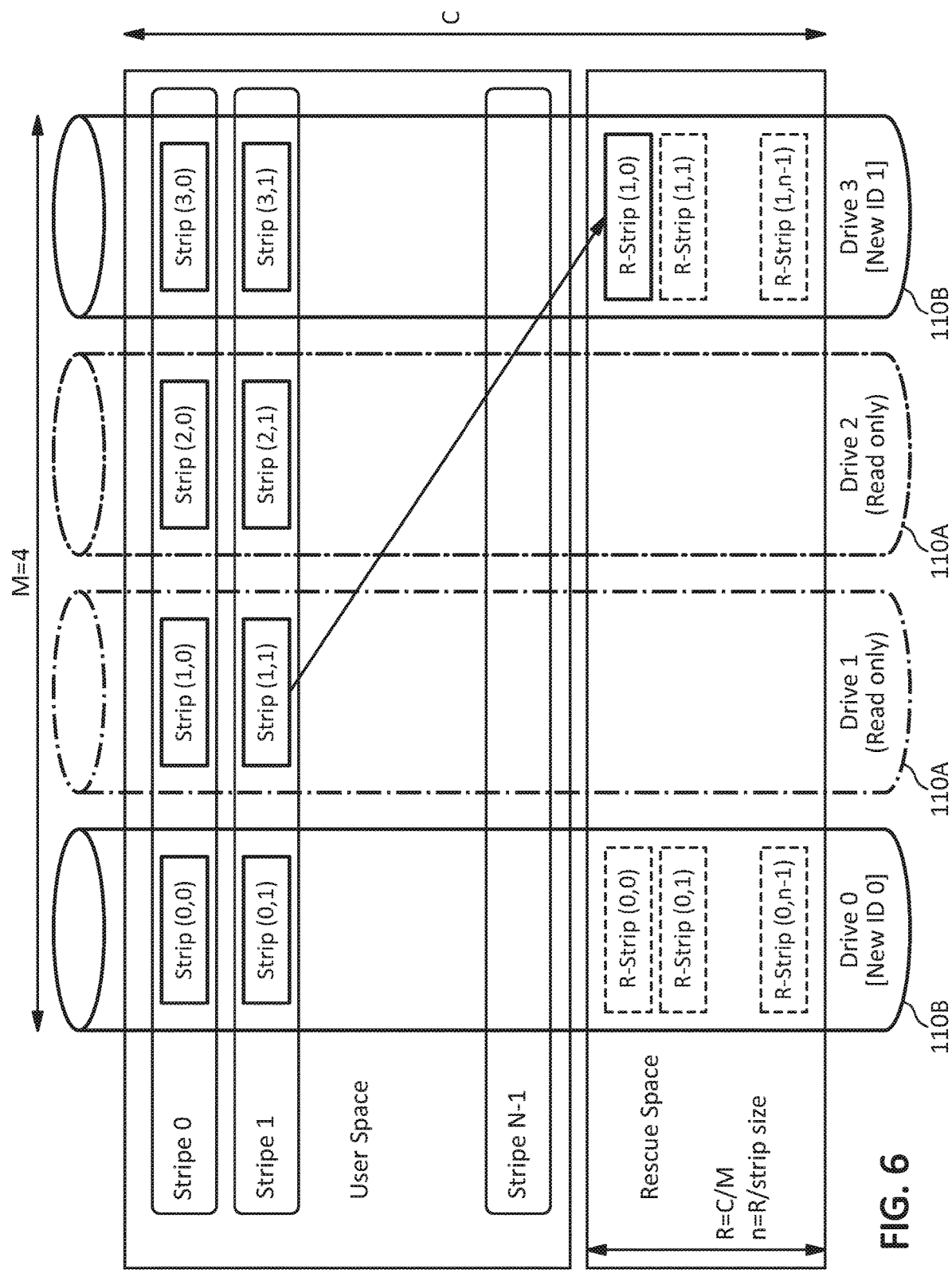
FIG. 6 illustrates a schematic diagram of an embodiment of a RAID-0 system in accordance with example embodiments of the disclosure.

FIG. 6 illustrates a schematic diagram of an embodiment of a RAID-0 system in accordance with example embodiments of the disclosure. The embodiment illustrated in FIG. 6 may include four fault resilient storage devices 110 (i.e., M=4) in which the storage devices identified as Drive 1 and Drive 2 have transitioned to a read-only mode. Therefore, M'=2. Using Formula B described above, Drive 0 may remain mapped to new Drive ID 0 (e.g., 1 mod 1), and Drive 3 may be mapped to new Drive ID 1 (e.g., 3 mod 1).

Also, using the formula Target Drive ID sid % (M'−1), if stripe 1 is written, Stripe ID=1, and thus, Target Drive ID=1% 2=1. That is, the target drive may be the storage device 110B with alternate (New) drive identification number 1 (i.e., previous Drive 2).

In some embodiments, when a first faulty storage device 110A transitions to a read-only mode, the RAID-0 system may transition to an emergency mode in which the volume manager 115 may (i) allocate a rescue space on each of the remaining, unaffected storage devices 110E (if adequate rescue space has not been allocated already, or if insufficient space has been allocated) for metadata and rescued user data from a faulty storage device 110A, and/or (ii) create and/or maintain a first mapping table for the first faulty storage device 110A. The RAID-0 system may then operate in a manner similar to the single device failure embodiment described above.

In some embodiments, if a second faulty storage device 110A transitions to a read-only mode, the RAID-0 system may once again allocate a rescue space on each of the remaining, unaffected storage devices 110B (if adequate rescue space has not been allocated already, or if insufficient space has been allocated) for metadata and rescued user data from a faulty storage device 110A. In some embodiments, the RAID-0 system may then create and/or maintain a second mapping table for the second faulty storage device 110A. Each of the mapping tables may be designated as the Lth mapping table, where L=1 . . . M', and the Lth mapping table corresponds to the Lth faulty storage device. In other embodiments, a RAID-0 system may create and/or modify a single mapping table to map data stripes and/or strips of all of the faulty storage devices 110A to the unaffected storage devices 110B. In some embodiments, one or more mapping tables may be stored in a reserved rescue space, for example, before a Disk Data Format (DDF) structure for a RAID configuration.

The RAID-0 system may then reassign drive IDs of the unaffected storage devices 110B, for example, based on Formula B, and proceed to operate with the two faulty storage devices 110A operating in read-only mode.

When a read command is received from the host, the volume manager 115 may check the one or more emergency mapping tables to determine whether an entry has been made for the stripe to be read. If no entry has been made, then the volume manager 115 may read the stripe as it would have, in ordinary operation, reading a strip from each of the storage devices 110, including the two faulty storage devices 110A. If the one or more emergency mapping tables contain an entry for the stripe, then the entry may be used to determine where to read the strip that ordinarily would have been read from one or both of the faulty storage devices 110A.

When a write command is received from the host, the volume manager 115 may check the one or more emergency mapping tables to determine whether an entry has been made for the stripe. If no entry has been made yet (e.g., the stripe is not registered) the volume manager 115 may create an entry in the one or more emergency mapping tables to indicate where the strips that ordinarily would have been written to the faulty storage devices 110A (the storage devices that have transitioned to read-only mode), are to be written. If the one or more emergency mapping tables already contain an entry for the stripe, then the entry may be used to determine where to write the strips that ordinarily would have been written to the faulty storage devices 110A. In either case, the volume manager 115 may then write the strips to the array of storage devices 110, writing the strips that ordinarily would have been written to the faulty (e.g., read-only) storage devices 110A to rescue space in the other storage devices 110B.

Rescue Space Management with Data Block Write

Figure 7:
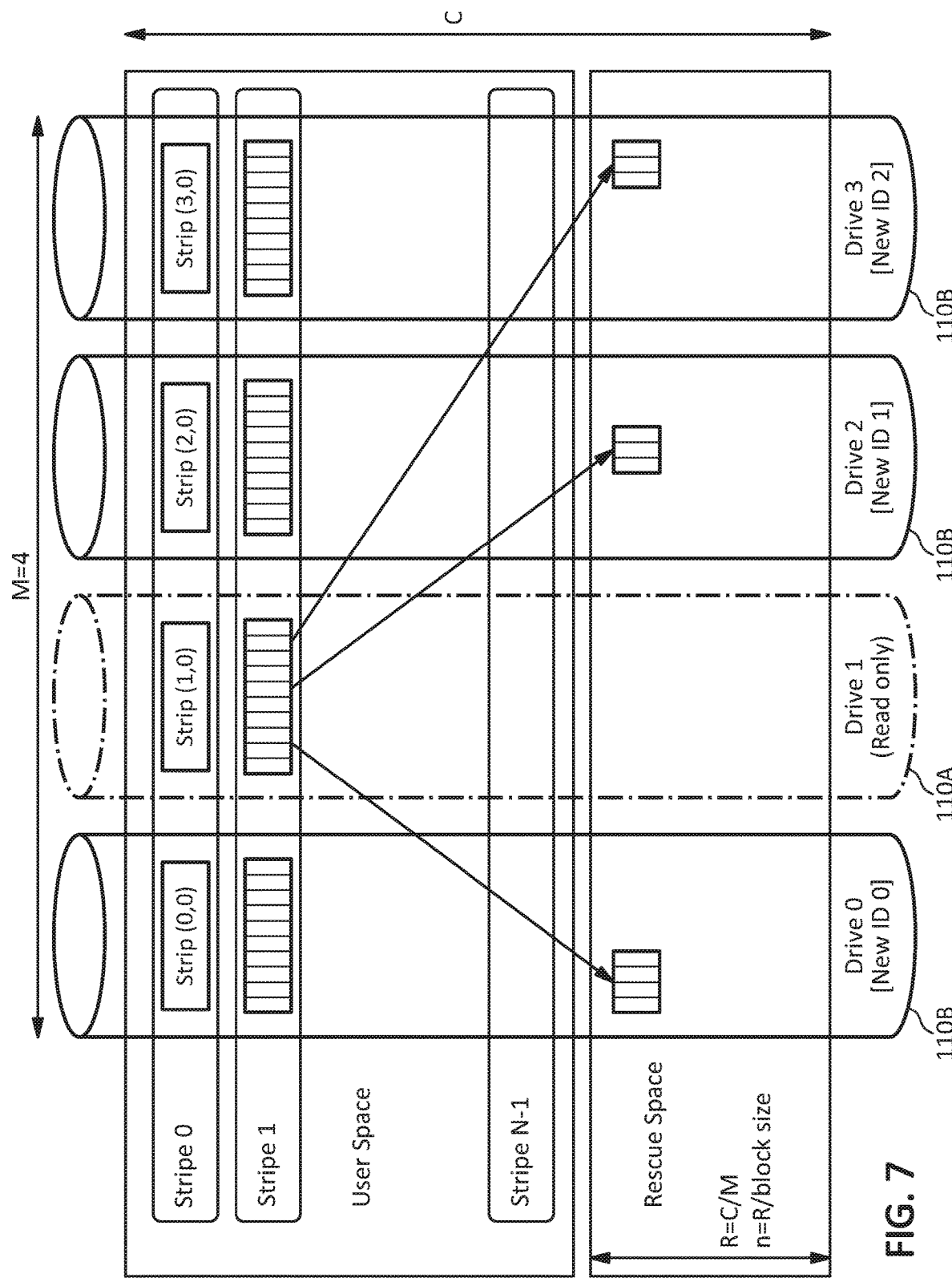
FIG. 7 illustrates a schematic diagram of an embodiment of a RAID-0 system that may implement rescue space management with data block writing in accordance with example embodiments of the disclosure.

FIG. 7 illustrates a schematic diagram of an embodiment of a RAID-0 system that may implement rescue space management with data block writing in accordance with example embodiments of the disclosure. The embodiment illustrated in FIG. 7 may include four fault resilient storage devices 110 (i.e., M=4) in which the storage device identified as Drive 1 has transitioned to a read-only mode. The embodiment illustrated in FIG. 7 may in some ways be constructed and operate in a manner similar to the embodiment described above with respect to FIGS. 4A-4C, but rather than redirecting an entire strip from a faulty storage device 110A to the rescue space of a single unaffected storage device 110B, a strip may be spit into rescue blocks (which may also be referred to as R-blocks) that may be distributed across the rescue spaces of some or all of the remaining unaffected storage devices 110B.

Within each storage device 110, some or all of the rescue space may be split into rescue blocks (which may be referred to as R-blocks). The size of R-blocks may be set, for example, to the same size as a data block size used generally by the storage device.

In some embodiments, the volume manager 115 may maintain an emergency mapping table in which each entry may simply be a stripe ID to indicate that the stripe has been mapped to the rescue space in the unaffected storage devices 110B. For example, in the embodiment illustrated in FIG. 7 in which the storage device 110A designated as Drive ID 1 has entered read-only mode, an entry in the emergency mapping table of (stripe ID)=(1) may indicate that Strip (1,1) is split into 3 chunks and mapped to all unaffected (e.g., live) storage devices 110B.

In some embodiments, the portion of the strip from the faulty storage device that may be stored in the rescue space of each storage device (which may be referred to as a chunk) may be equal to the strip size/block size/(M−1). To accommodate a strip size and block size that may not be evenly divided into the number of unaffected storage devices 110B, the chunk stored in the rescue space of a target storage device 110B that satisfies the formula Target Drive ID<(strip size/block size) mod (M−1) may include an extra block. Thus, for the example illustrated in FIG. 7 in which Strip (1,1) may include 10 blocks, the chunk of Strip (1,1) stored in new Drive ID 1 may include 3 blocks, the chunk stored in new Drive ID 2 may include 3 blocks, but the chunk stored in new Drive ID 0 may include 4 blocks because new Drive ID 0 is less than 10 mod 3 (which equals 1).

In the embodiment illustrated in FIG. 7, the target drive ID (e.g., for a read or write operation) may be implicitly determined, for example, by the equation Target Drive ID=Stripe ID % (M−1) where M may indicate the number of storage devices 110. For example, if M=4 and Stripe 1 is written, Stripe ID=1, and thus, Target Drive ID=1%3=1.

In the embodiment illustrated in FIG. 7, the volume manager 115 may reassign the drive identification numbers for each unaffected storage device 110E using, for example, Formula C as follows:

If drive ID<faulty drive ID, new drive ID=((drive ID−1)+$M$)mod($M$−1)

Otherwise, new drive ID=((drive ID−1)+($M$−1))mod($M$−1).  (Formula C)

In some embodiments, the size of rescue space R in each storage device 110 may be set, for example, to R=C/M, where C may be the capacity of each of the storage devices of the array of storage devices 110, and M may be the total number of storage devices. The rescue space R in each storage device 110 may be capable of storing n blocks, where n=R/(block size).

When a read command is received from the host, the volume manager 115 may check the emergency mapping table to determine whether an entry has been made for the stripe of the strip to be read. If no entry has been made, then the volume manager 115 may read the stripe as it would have in ordinary operation, reading a strip from each of the storage devices 110, including the faulty storage device 110A. If the emergency mapping table contains an entry for the stripe, the chunks of the strip corresponding to the faulty storage device 110A (in this example, Drive 1) may be read from the rescue space of the unaffected storage devices 110B (in this example, the storage devices with new Drive IDs 0, 1, and 2) and reassembled into Strip (1,1).

When a write command is received from the host, the volume manager 115 may check the emergency mapping table to determine whether an entry has been made for the stripe of the strip to be written. If no entry has been made yet (e.g., the stripe is not registered) the volume manager 115 may create an entry in the emergency mapping table to indicate that chunks of the strip that ordinarily would have been written to the faulty storage device 110A (the storage device that has transitioned to read-only mode), are to be written to the unaffected storage devices 110B. If the emergency mapping table already contains an entry for the stripe, then the entry may be used to determine that chunks of the strip that ordinarily would have been written to the faulty storage device 110A (the storage device that has transitioned to read-only mode), are to be written to the unaffected storage devices 110B. In either case, the volume manager 115 may then write the chunks of the strip originally intended for Drive 1, to the rescue spaces of the unaffected storage devices 110B as illustrated in FIG. 7.

Fault Resilient System with Quality-of-Service Management

In some embodiments, a fault resilient (FR) storage system such as an FR-RAID-0 system may implement one or more quality-of-service (QoS) management features in accordance with example embodiments of the disclosure. For example, a user and/or volume manager may adjust the size of strips in a RAID striping configuration, and/or the writing technique used to write data to in a rescue space on one or more storage devices in the RAID configuration, to provide a specific QoS level.

Figure 8:
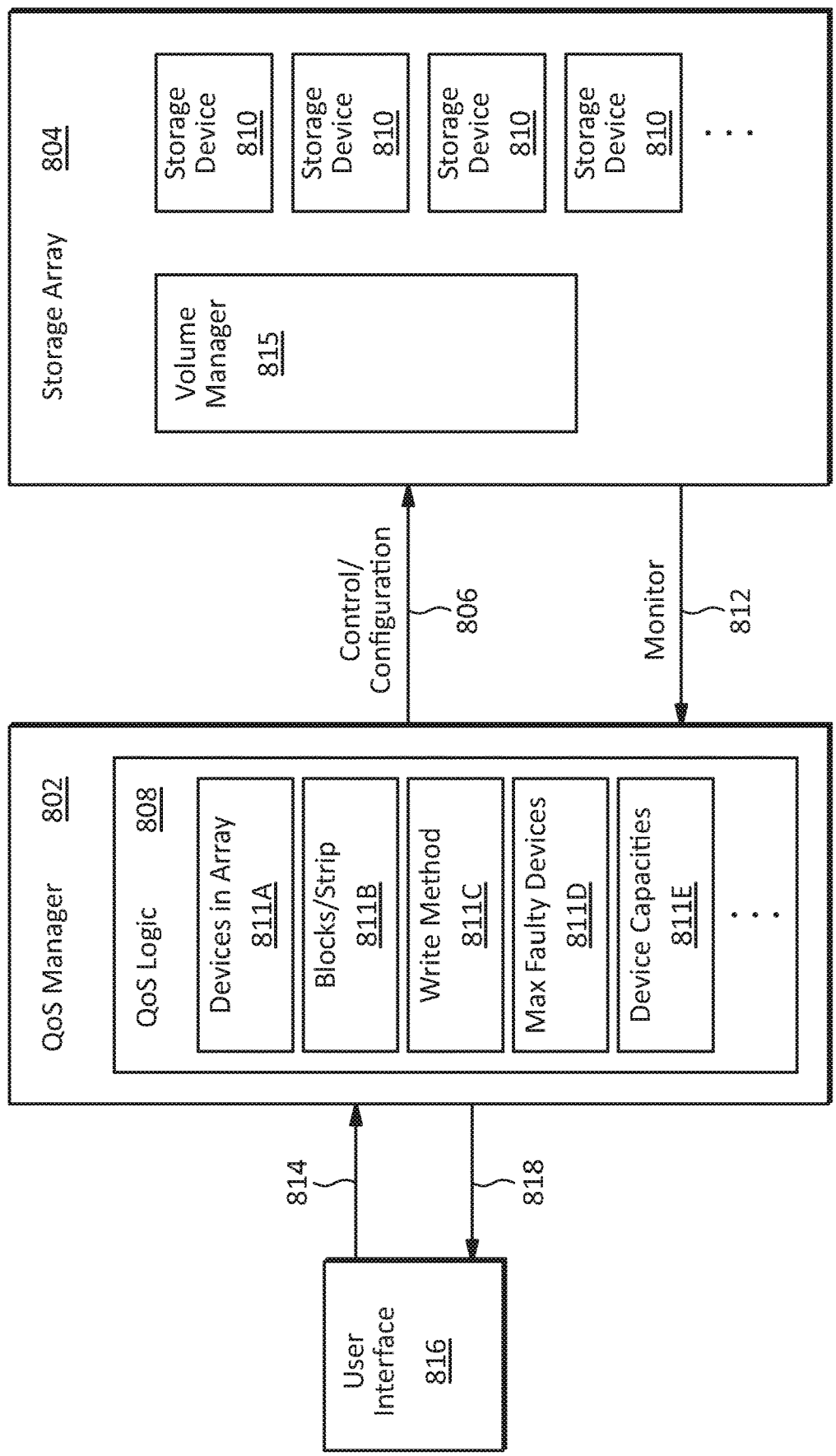
FIG. 8 illustrates an example embodiment of a system for implementing quality-of service (QoS) management in a storage system in accordance with example embodiments of the disclosure.

FIG. 8 illustrates an example embodiment of a system for implementing QoS management in a storage system in accordance with example embodiments of the disclosure. The embodiment illustrated in FIG. 8 may include a QoS manager 802 configured to implement one or more QoS features for a storage array 804, for example, through one or more control and/or configuration inputs 806. The storage array 804, which may be arranged, for example, as a RAID-0 array, may include a volume manager 815 and any number of storage devices 810. In some embodiments, the storage array 804 may be implemented at least in part with any of the fault resilient storage devices, systems, and/or methods disclosed herein.

The QoS manager 802 may include QoS logic 808 that may receive, utilize, control, configure, direct, notify, and/or the like, any number of parameters relating to QoS such as the number of storage devices 811A in the storage array 804, the number of data blocks in a strip 811B, one or more write methods 811C used in a rescue space, the number of faulty storage devices 811D that may be accommodated by the storage array 804, the capacity or capacities 811E of storage devices used in the storage array 804, and/or the like.

For example, in some embodiments, a QoS metric such as performance may be influenced by the parameters 811A-811E in any number of the following manners. Increasing the number of storage devices 811A in the storage array 804 may increase performance, for example, in terms of storage capacity, latency, throughput, and/or the like. The number of data blocks 811B in a strip may be tuned based on the type of anticipated storage transactions. For example, using larger data blocks may provide greater throughput with larger, less frequent transactions, whereas smaller data blocks may provide a greater number of input and/or output operations per second (IOPS) with small, more frequent transactions. The write method 811C may also be tuned, for example, because writing data blocks to rescue spaces on multiple storage devices may take less time than writing a strip to the rescue space of a single storage device. Increasing the number of faulty storage devices 811D that may be accommodated by the storage array 804 may reduce performance, for example, because accommodating more faulty devices may involve more allocating a greater percentage of storage device capacity.

The QoS manager 802 may operate automatically, manually, or in any combination thereof. The QoS manager 802 may operate automatically, for example, in response to monitoring one or more parameters 812 from the storage array 804. The QoS manager 802 may operate manually, for example, in response to one or more parameters 814 received through a user interface 816. Additionally, the QoS manager 802 may provide one or more outputs 818 through the user interface 816 that may instruct a user to take one or more specific actions, for example, to add and/or remove one or more storage devices 810.

In some embodiments, given system requirements from a user, the QoS manager 802 may determine one or more parameters based on storage performance information. For example, a user may specify that the storage array 804 may operate as an RF-RAID-0 configuration that may accommodate one storage device failure with 500K IOPS for 32K blocks and a total storage capacity of 8 TB. Based on these inputs, the QoS manager 802 may determine the following parameters to arrive at a number of storage devices that may be used to provide the specified performance:

Storage device capacity: 1 TB;
4K write IOPS per storage device: 400K;
32K write IOPS per storage device: 200K; and
RAID strip size: 32K.
Solving for capacity: $(1-1/M)*2*(M-1)>=8$, $M^2-6M+1>0$, $(M-3)^2 \geq 8$, and thus, M=6.
Solving for performance: $200K*(M-1)/2>=500$ K, and thus, M=6.
Therefore, six storage devices may be used to provide the specified performance.

In some embodiments, the QoS manager 802 and/or QoS logic 808 may be implemented with hardware, software, or any combination thereof, including combinational logic, sequential logic, one or more timers, counters, registers, state machines, CPLDs, FPGAs, ASICs, CISC processors and/or RISC processors, and/or the like executing instructions stored in volatile memories such as DRAM and/or SRAM, nonvolatile memory such as flash memory and/or the like, as well as GPUs, NPUs, and/or the like. The QoS manager 802 and/or QoS logic 808 may be implemented as one or more separate components, integrated with one or more other components such as the volume manager 815, a host, and/or any combination thereof.

Figure 9:
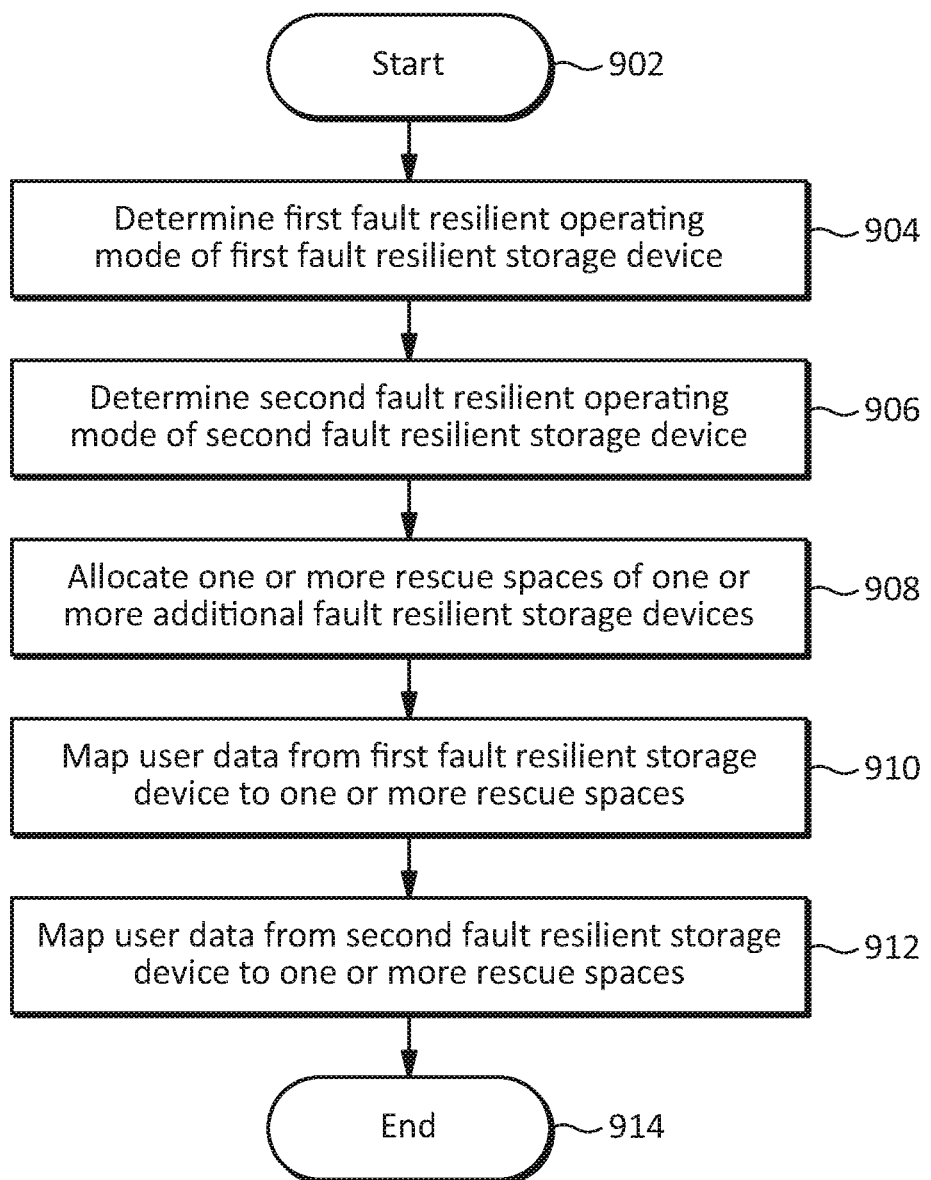
FIG. 9 illustrates an embodiment of a method of operating a storage array in accordance with example embodiments of the disclosure.

FIG. 9 illustrates an embodiment of a method of operating a storage array in accordance with example embodiments of the disclosure. The method may begin at operation 902. At operation 904, the method may determine a first fault resilient operating mode of a first fault resilient storage device of the storage array. At operation 906, the method may determine a second fault resilient operating mode of a second fault resilient storage device of the storage array. At operation 908, the method may allocate one or more rescue spaces of one or more additional fault resilient storage devices of the storage array. At operation 910, the method may map user data from the first fault resilient storage device to the one or more rescue spaces. At operation 912, the method may map user data from the second fault resilient storage device to the one or more rescue spaces. The method may end at operation 914.

Figure 10:
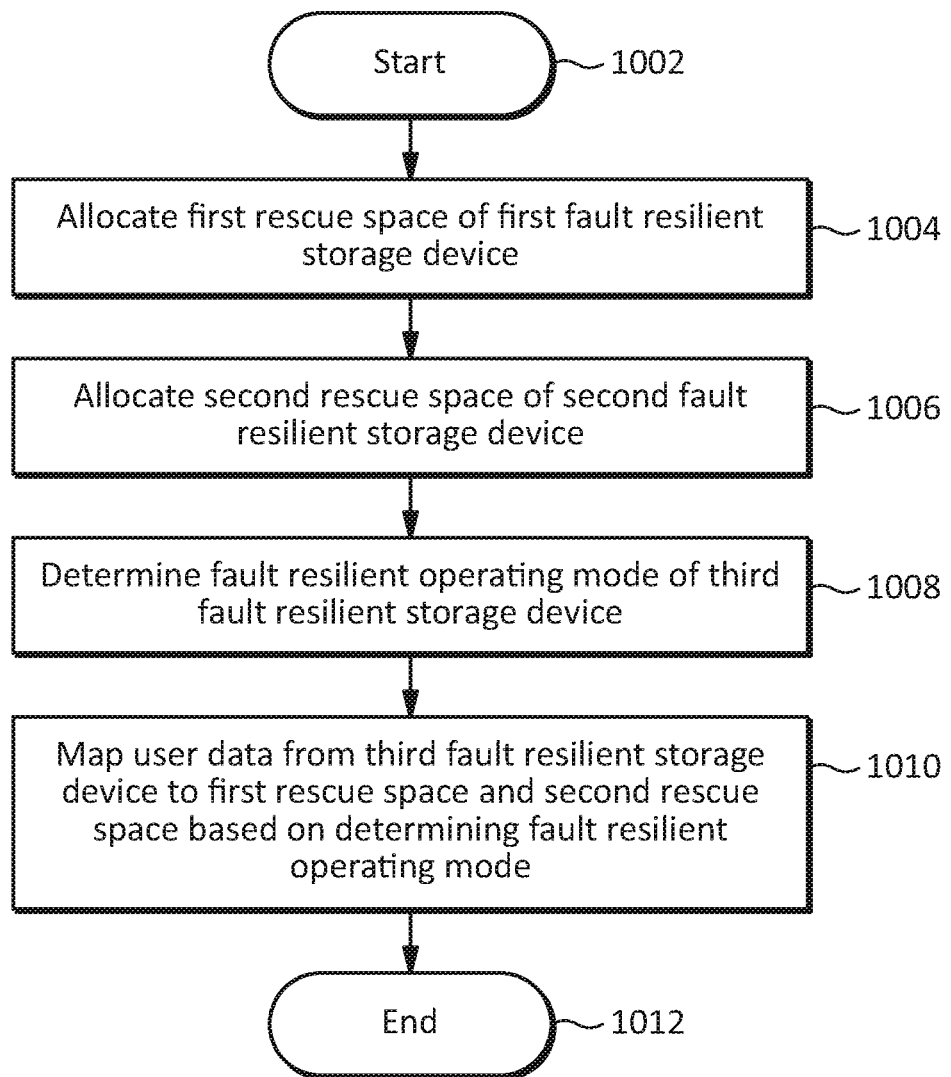
FIG. 10 illustrates an embodiment of another method of operating a storage array in accordance with example embodiments of the disclosure.

FIG. 10 illustrates an embodiment of another method of operating a storage array in accordance with example embodiments of the disclosure. The method may begin at operation 1002. At operation 1004, the method may allocate a first rescue space of a first fault resilient storage device of the storage array. At operation 1006, the method may allocate a second rescue space of a second fault resilient storage device of the storage array. At operation 1008, the method may determine a fault resilient operating mode of a third fault resilient storage device of the storage array. At operation 1010, the method may map user data from the third fault resilient storage device to the first rescue space and the second rescue space based on determining the fault resilient operating mode. The method may end at operation 1012.

Figure 11:
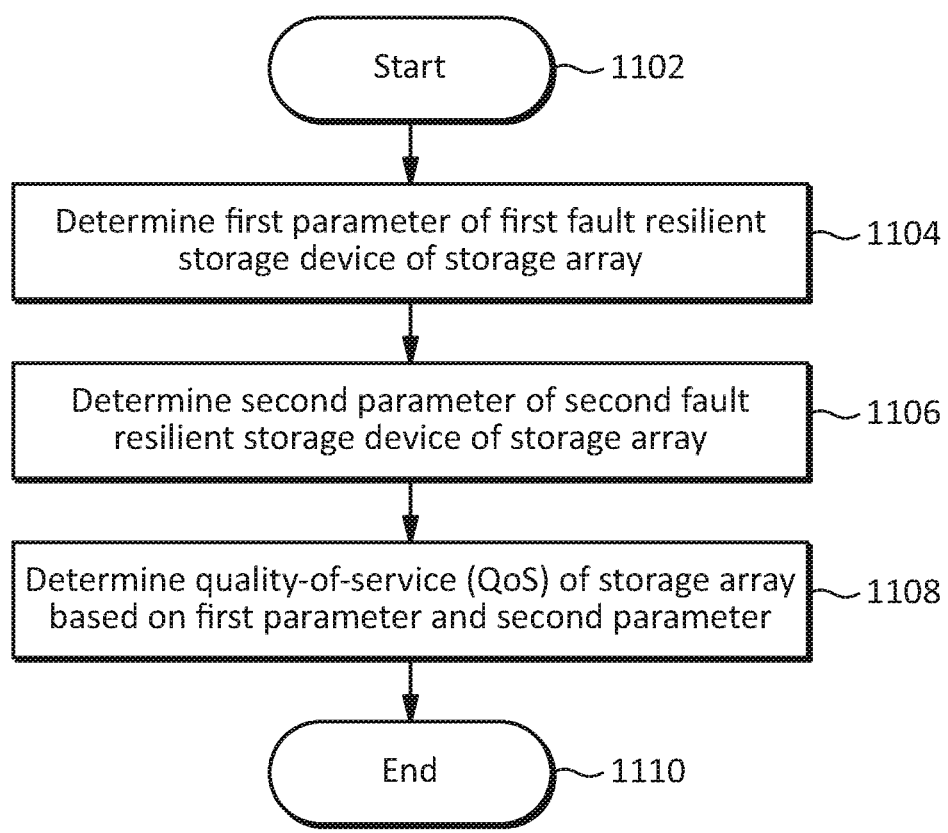
FIG. 11 illustrates an embodiment of a further method of operating a storage array in accordance with example embodiments of the disclosure.

FIG. 11 illustrates an embodiment of a further method of operating a storage array in accordance with example embodiments of the disclosure. The method may begin at operation 1102. At operation 1104, the method may determine a first parameter of a first fault resilient storage device of the storage array. At operation 1106, the method may determine a second parameter of a second fault resilient storage device of the storage array. At operation 1108, the method may determine a quality-of-service (QoS) of the storage array based on the first parameter and the second parameter. The method may end at operation 1110.

The operations and/or components described with respect to the embodiments illustrated in FIGS. 9-11, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied.

The embodiments described above have been described in the context of various implementation details, but the principles of this disclosure are not limited to these or any other specific details. For example, some storage arrays have been described in the context of systems in which the capacity and/or size of storage devices and/or rescue spaces may be the same for each storage devices, but different capacity and/or size of storage devices and/or rescue spaces may be used. As another example, some embodiments have been described in the context of RAID system such as RAID-U, but the principles may also be applied to any other type of storage arrays.

As another example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, step, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, based on" may refer to "based at least in part on." In some embodiments, "disabled" may refer to "disabled at least in part." A reference to a first element may not imply the existence of a second element. Various organizational aids such as section headings and the like may be provided as a convenience, but the subject matter arranged according to these aids and the principles of this disclosure are not defined or limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
receiving, at a storage device, a command;
sending, based on the command, from the storage device, information about a power cycle feature of the storage device;
determining a fault condition of the storage device;
selecting a fault resilient mode based on the fault condition of the storage device, wherein the fault resilient mode comprises a power cycle mode; and
operating the storage device in the fault resilient mode;
wherein the operating the storage device in the fault resilient mode comprises:
performing, based on the information about the power cycle feature, a power cycle operation on the storage device.

2. The method of claim 1, wherein the storage device is configured to perform a namespace capacity management command received from a host.

3. The method of claim 2, wherein the namespace capacity management command comprises a resize subcommand.

4. The method of claim 1, wherein the storage device is configured to report, to a host, the fault resilient mode.

5. A method comprising:
receiving, at a storage drive, a command;
sending, based on the command, from the storage drive, information about a format feature of the storage drive;
determining, by the storage drive, a fault condition of the storage drive;
selecting a fault resilient mode based on the fault condition of the storage drive, wherein the fault resilient mode comprises a format mode; and
operating the storage drive in the fault resilient mode;
wherein:
the storage drive comprises a storage medium; and
the operating the storage drive in the fault resilient mode comprises:
formatting, based on the information about the format feature, at least a portion of the storage medium.

6. The method of claim 5, wherein the storage drive is configured to perform a namespace capacity management command received from a host.

7. The method of claim 6, wherein the namespace capacity management command comprises a resize subcommand.

8. The method of claim 5, wherein the storage drive is configured to report, to a host, the fault resilient mode.

9. A method comprising:
determining, by a storage drive, a fault condition of the storage drive;
selecting a fault resilient mode based on the fault condition of the storage drive, wherein the fault resilient mode comprises a modified performance mode;
operating the storage drive in the fault resilient mode; and
receiving, from the storage drive, performance information about the storage drive;
wherein the operating the storage drive in the modified performance mode comprises sending, based on the performance information, write data to the storage drive with a modified operation speed.

10. The method of claim 9, wherein the storage drive is configured to perform a command received from a host.

11. The method of claim 10, wherein the command comprises a namespace capacity management command.

12. The method of claim 11, wherein the namespace capacity management command comprises a resize subcommand.

13. The method of claim 11, wherein the namespace capacity management command comprises a zero-size namespace subcommand.

14. The method of claim 9, wherein the storage drive is configured to report, to a host, the fault resilient mode.

15. The method of claim 9, wherein the performance information comprises bandwidth information.

16. The method of claim 9, wherein the performance information comprises information about access operation frequency.

17. An apparatus comprising:
a storage drive comprising:
a storage medium; and
a storage controller, wherein the storage controller is configured to:
determine a fault condition of the storage drive;
select a fault resilient mode based on the fault condition of the storage drive, wherein the fault resilient mode comprises a modified read mode; and
operate the storage drive in the fault resilient mode;
receive a write request; and
determine to perform, based on the write request and the modified read mode, a write operation.

18. The apparatus of claim 17, wherein the storage drive is configured to perform a namespace capacity management command received from a host.

19. The apparatus of claim 17, wherein the storage drive is configured to report, to a host, the fault resilient mode.

* * * * *